(12) United States Patent
De Roche

(10) Patent No.: US 12,371,154 B2
(45) Date of Patent: Jul. 29, 2025

(54) THRUST VECTORING PROPULSOR

(71) Applicant: AEROFEX, INC., Redondo Beach, CA (US)

(72) Inventor: Mark Stephen De Roche, Redondo Beach, CA (US)

(73) Assignee: Aerofex, Inc., Redondo Beach, CA (US)

( * ) Notice: Subject to any disclaimer, the term of this patent is extended or adjusted under 35 U.S.C. 154(b) by 0 days.

(21) Appl. No.: 18/797,777

(22) Filed: Aug. 8, 2024

(65) Prior Publication Data

US 2025/0153844 A1    May 15, 2025

Related U.S. Application Data

(60) Provisional application No. 63/663,089, filed on Jun. 22, 2024, provisional application No. 63/642,309, filed on May 3, 2024, provisional application No. 63/559,318, filed on Feb. 29, 2024, provisional application No. 63/597,429, filed on Nov. 9, 2023.

(51) Int. Cl.
  *B64C 15/12*        (2006.01)
  *B64C 11/00*        (2006.01)
  *F16D 3/30*         (2006.01)

(52) U.S. Cl.
  CPC ............ *B64C 15/12* (2013.01); *B64C 11/001* (2013.01); *F16D 3/30* (2013.01)

(58) Field of Classification Search
  CPC ....... B64C 15/12; B64C 11/001; B64C 27/20; B64C 27/12
  See application file for complete search history.

(56) References Cited

U.S. PATENT DOCUMENTS

| | | | | |
|---|---|---|---|---|
| 2,510,561 | A * | 6/1950 | De Laval | B64C 11/001 60/269 |
| 6,892,980 | B2 * | 5/2005 | Kawai | B64C 29/0033 244/12.4 |
| 7,819,358 | B2 * | 10/2010 | Belleville | B64D 27/20 244/55 |
| 10,994,838 | B2 * | 5/2021 | DeLorean | B64D 27/32 |
| 11,208,197 | B2 * | 12/2021 | Marot | B64U 50/19 |
| 11,673,648 | B2 * | 6/2023 | Carpenter, Jr. | B64C 11/001 244/54 |
| 12,270,301 | B2 * | 4/2025 | Neiser | B64C 23/04 |
| 2020/0339252 | A1 * | 10/2020 | Choi | B64C 27/82 |

* cited by examiner

*Primary Examiner* — Brian M O'Hara
(74) *Attorney, Agent, or Firm* — Martensen IP; Michael C. Martensen

(57) ABSTRACT

A two-dimensionally gimballed propeller produces vectored thrust. A directional propeller generates a two-dimensional propulsive thrust vector without adverse moments or translational forces. Forces necessary to control the propulsive vector are minimized by directing the vector through the propeller's aerodynamic center apart from the power source delivered to the propeller via a driveshaft having a fixed orientation.

25 Claims, 29 Drawing Sheets

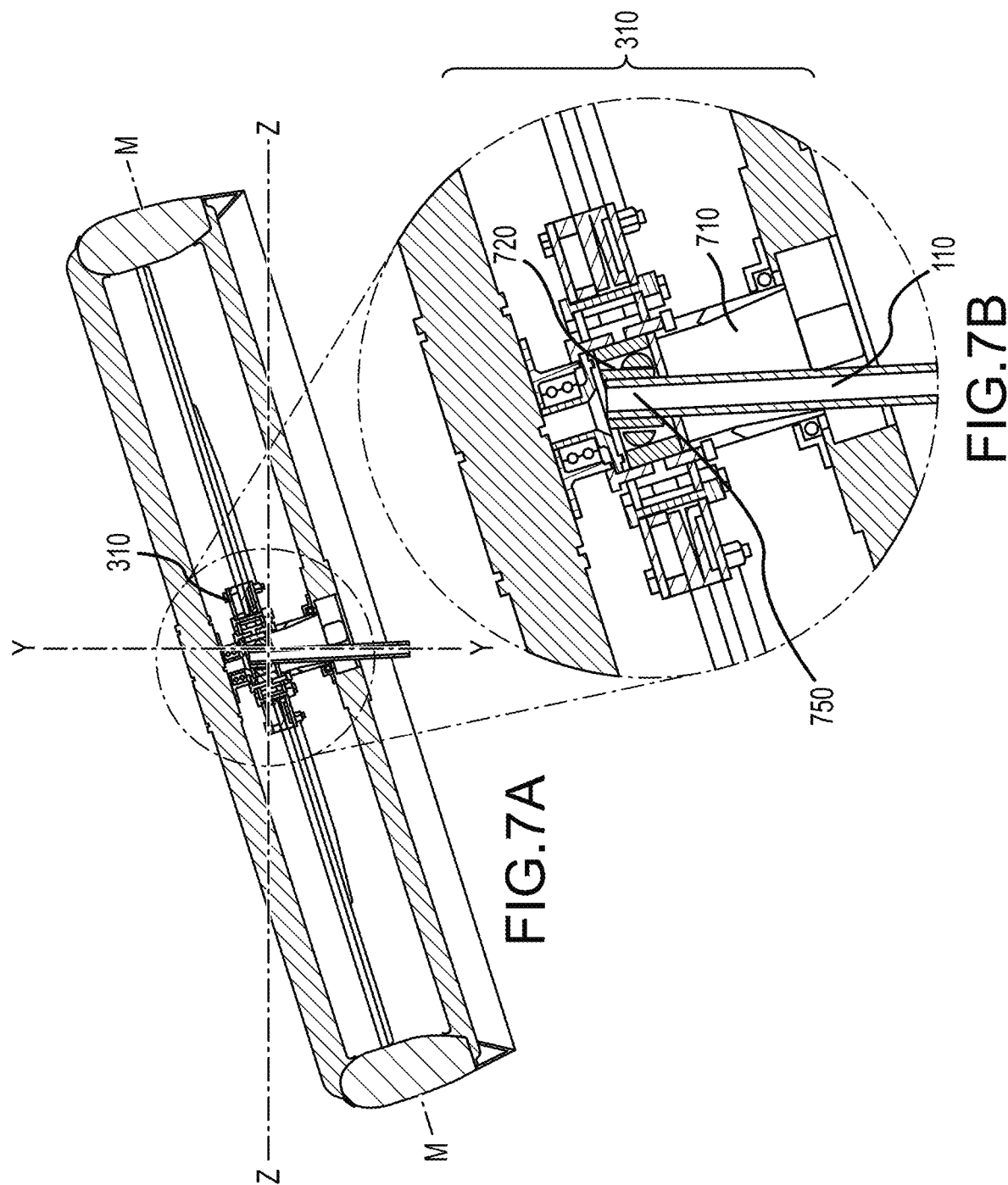

THRUST VECTORING PROPULSOR

RELATED APPLICATION

The present application relates to and claims the benefit of priority to U.S. Provisional Patent Application Nos. 63/597,429 filed Nov. 9, 2023, 63/559,318 filed Feb. 29, 2024, 63/642,309 filed May 3, 2024, and 63/663,089 filed Jun. 22, 2024, all of which are hereby incorporated by reference in their entirety for all purposes as if fully set forth herein.

BACKGROUND OF THE INVENTION

Field of the Invention

Embodiments of the present invention relate, in general, to a ducted propeller and more particularly to a thrust vectoring ducted propeller.

Relevant Background

Thrust vectoring or thrust vector control is the ability to manipulate the direction and magnitude of the thrust of a propulsor to control the attitude or angular velocity of a vehicle. Thrust vectoring is known to increase the performance and efficiency of craft that utilize it, as it augments and/or supplants the control system.

The development of thrust vectoring reaction engines led to the advent of rocketry and rocket flight in the 1930's. Continued development of thrust vectoring and control technology have more recently enabled rockets to return to their launch sites and land on their tails. Thrust vectoring of turbine engines has led to modern fighter aircraft with extreme maneuverability and flight at high angles of attack in the post-stall regime. But turbine engines are inefficient at low altitude and at low speed driving a need for a vectored thrust developed by a propeller.

Thrust vectoring for propeller driven craft remains a challenge. Propeller based thrust vectoring has relied mainly on 1) cyclically variable blade pitch to tilt the rotor plane, 2) deflection of the exit flow, or 3) tilting the engine and propeller as a cojoined pair to point the thrust vector. None of these methods has resulted in the revolutionary performance improvements seen with rockets and turbine aircraft.

Collectively varying blade pitch most often applies to open rotor systems whose blades are long enough to justify the added complexity of a swashplate and the inertia of pitch bearings at the hub. A collectively varying blade varies its pitch every cycle or rotation to produce a consistent downward thrust as the crafts move forward (or reward or sideways). "Rotor" and "propeller" are terms that are often used interchangeably. For purposes of the present invention, the term "rotor" refers to an assembly whose blades are unshrouded and have collective and cyclically variable pitch like a conventional helicopter rotor. A "propeller" as referred to herein may be shrouded or unshrouded with blades fixed in pitch or collectively adjustable in pitch. As a result of their length, rotational velocities of rotors are much slower than propellers to keep their tips below transonic speeds.

Rotor systems that tilt their rotor disc for control require a joint at the hub to allow tilting with respect to the mast. Many types of joints have been developed to accommodate the tilting, including constant velocity joints. As those joints do not transfer axial loads, complex arrangements are required to transfer the thrust loads into the mast.

In general, cyclic control of blade pitch is not suitable for ducted propellers. The centrifugal forces of a rotating propeller are much greater than the forces of a more slowly rotating rotor. The added complexity and weight of the pitch bearing and swashplate typically merit a blade long enough to benefit from the added structure and maintenance required. The constrained diameter of a ducted propeller with its high rotational velocities generally do not.

Aerodynamically manipulating the exit flow from the propeller takes many forms. Examples include peripheral control ejectors (see U.S. Pat. No. 8,413,932, DeRoche, 2013), diverters (see U.S. Pat. No. 10,538,311, Halcom et al. 2020) and sidewall treatments (see U.S. Pat. No. 5,277,381, Piasecki, 1994). While effective for their applications, manipulation of the slipstream is limited in the control forces it can generate. These forces are a fraction of the total thrust available and even those forces can vary with external conditions.

Tilting a propeller and its engine as a single unit to redirect thrust is common to tilt-rotor aircraft for transition between vertical and horizontal flight, but not as common for control. With the more recent introduction of distributed electric propulsion tilting a motor-propeller pair has become more widely explored for aircraft control.

While single axis tilting of a motor-propeller pair is simple mechanically, dual axis tilting can be quite complex (see U.S. Pat. No. 10,737,778, Oldroyd et al., 2020). One issue with motor-propeller tilting is that the location of the tilt axis leads to imbalanced control loads and adverse control moments. Additionally, control coupling in this configuration is exasperated by the high inertial and gyroscopic precession effects of the spinning core of the motor and is therefore mainly used with smaller unmanned aircraft or slower spinning rotors.

Lacking is the ability to vector thrust using a propeller. More specifically a need exists for a thrust vectoring ducted propeller capable of two-dimensional thrust control. These and other deficiencies of the prior art are addressed by one or more embodiments of the present invention.

Additional advantages and novel features of this invention shall be set forth in part in the description that follows, and in part will become apparent to those skilled in the art upon examination of the following specification or may be learned by the practice of the invention. The advantages of the invention may be realized and attained by means of the instrumentalities, combinations, compositions, and methods particularly pointed out in the appended claims.

SUMMARY OF THE INVENTION

A ducted propeller configured to produce and control a two-dimensional vectored thrust is disclosed and described herein. According to one embodiment of the present invention, a directional ducted propeller generates a propulsive thrust vector without adverse moments or translational forces. Forces necessary to control the propulsive vector are minimized by pivoting through the plane and center of thrust of the propeller. Moreover, the present invention maintains the engine (or motor) and driveshaft fixed to the body of a craft, while the propulsive thrust vector is directed independently.

One embodiment of the present invention isolates the engine and powertrain from the propulsive and aerodynamic loads generated by a ducted propeller. The ducted propeller configurations presented herein provide discrete load paths for the host vehicle, decreasing wear on the powertrain while providing simpler integration as compared to conventional propellers and rotors where torque, propulsion, and flight loads are carried by the mast or drive shaft.

A propeller assembly, a Constant Velocity (CV) joint, and an outboard strut form a system for directional thrust propeller. The propeller assembly includes an aerodynamic center with a pivot interface and a propeller pivot axis, which extends through the aerodynamic center of the propeller assembly. The propeller assembly also includes propeller blades, which each consist of a blade root, a blade tip, a blade main body, and a trailing edge assembly. The propeller assembly is housed, in one embodiment, within a propeller duct. The Constant Velocity (CV) joint, located within the aerodynamic center of the propeller assembly, is attached to a drive shaft located within the aerodynamic center of the propeller assembly. Another version of the present invention includes a gimbal assembly with a gimbal pivot interface and a propeller gimbal pivot axis, which also extend through the aerodynamic center. In such an embodiment the propeller assembly is independently directional in two dimensions. In both instances the outboard strut is located in between the propeller assembly and the pivot interface and is configured to convey a load generated by the propeller assembly to the pivot interface. The CV joint is, in one embodiment, a tripod joint.

Another version of the present invention includes a main bearing located in between the propeller assembly and the outboard strut. The main bearing conveys the load generated by the propeller assembly to the outboard strut. The outboard strut can include movable vanes, which, by way of a gyroscopic presession controller, counter the gyroscopic precession. In between the propeller assembly and the drive shaft is an inboard strut which is designed to convey the radial load generated by the propeller assembly. In between the inboard strut and the propeller assembly is a secondary bearing.

The features and advantages described in this disclosure and in the following detailed description are not all-inclusive. Many additional features and advantages will be apparent to one of ordinary skill in the relevant art in view of the drawings, specification, and claims hereof. Moreover, it should be noted that the language used in the specification has been principally selected for readability and instructional purposes and may not have been selected to delineate or circumscribe the inventive subject matter; reference to the claims is necessary to determine such inventive subject matter.

BRIEF DESCRIPTION OF THE DRAWINGS

The features and objects of the present invention and the manner of attaining them will become more apparent, and the invention itself will be best understood, by reference to the following description of one or more embodiments taken in conjunction with the accompanying drawings, wherein:

FIG. 7A show a cutaway view of a thrust vectoring ducted propeller according to one embodiment of the present invention including a central hub of the propeller assembly.

FIGS. 7B and 7C are expanded views of the central hub of the propeller assembly of FIG. 7A.

Figure 1:
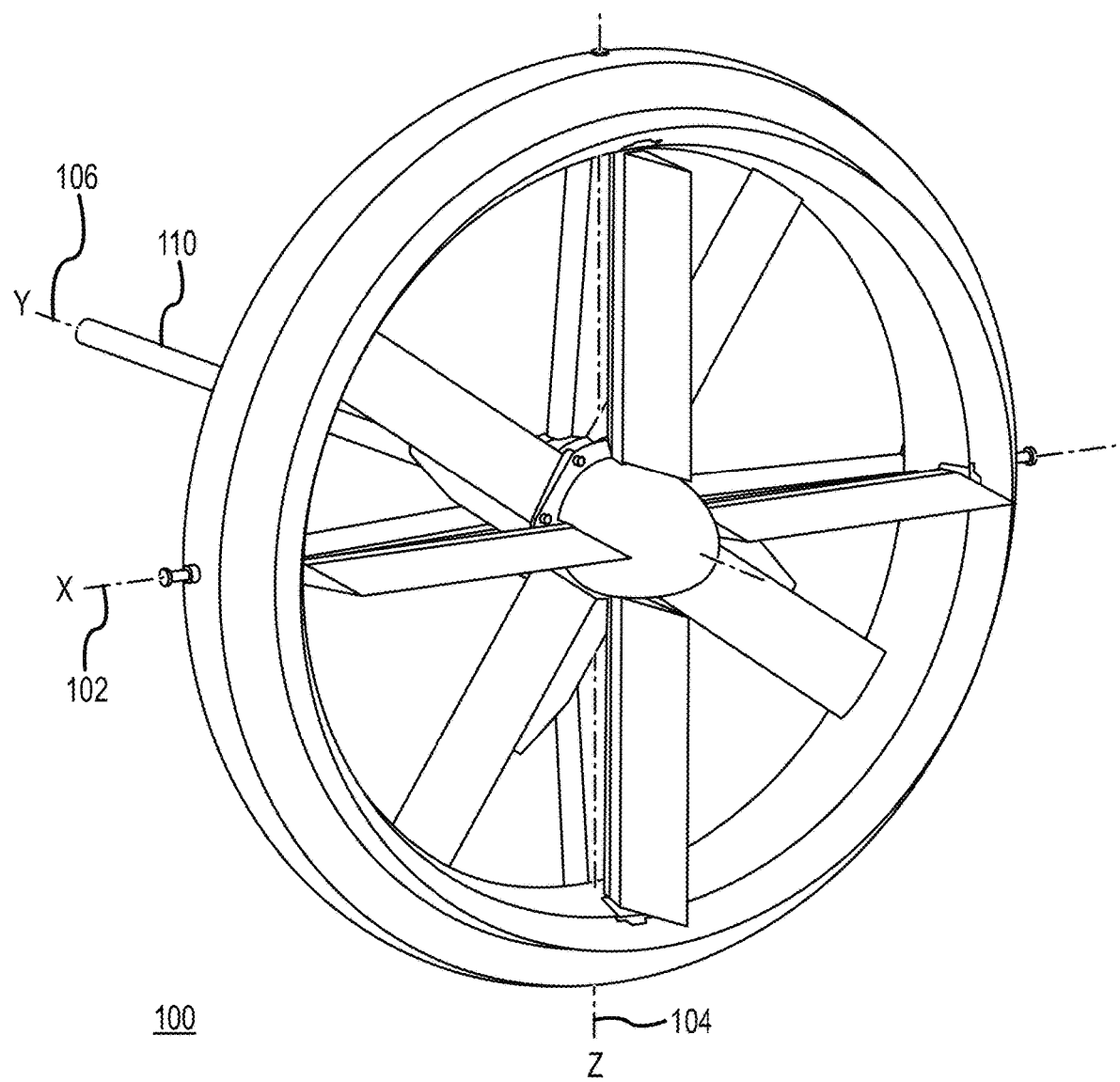
FIG. 1 is an isometric view of a thrust vectoring ducted propeller according to one embodiment of the present invention.

The Figures depict embodiments of the present invention for purposes of illustration only. Like numbers refer to like elements throughout. In the figures, the sizes of certain lines, layers, components, elements or features may be exaggerated for clarity. One skilled in the art will readily recognize from the following discussion that alternative embodiments of the structures and methods illustrated herein may be employed without departing from the principles of the invention described herein.

DESCRIPTION OF THE INVENTION

A fully gimballing ducted propeller pivots about and directs its thrust through an aerodynamic center. In one embodiment of the present invention a drive shaft is coupled to a constant velocity joint at a propeller assembly's aerodynamic center. Loads (thrust) generated by the propeller assembly are conveyed to the propeller duct and thereafter to the vehicle on which it is mounted through one or more struts. The invention can be configured as a pusher or puller propulsor with either a fixed pitch propeller in which thrust can be varied by rotational velocity, or a constant rotational speed configuration in which thrust is varied by modified the pitch of the propeller assembly. Gyroscopic precession is compensated by way of a plurality of guide vanes and a precession controller.

The present invention is fully contemplated to provide propeller propulsion for either air or marine craft. For clarity, the aeronautical version will be explained in detail with the understanding that the innovations presented herein apply equally to both. For the sake of brevity in the following descriptions, the "Thrust Vectoring Ducted Propeller" invention described herein, including its embodiments will be referenced simply as the "Propulsor".

Embodiments of the present invention are hereafter described in detail with reference to the accompanying Figures. Although the invention is described and illustrated with a certain degree of particularity, it is understood that the present disclosure has been made only by way of example and that numerous changes in the combination and arrangement of parts can be resorted to by those skilled in the art without departing from the spirit and scope of the invention.

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The terminology used herein is for the purpose of describing embodiments only and is not intended to be limiting of the invention. As used herein, the singular forms "a," "an" and "the" are intended to include the plural forms as well, unless the context clearly indicates otherwise. Thus, for example, reference to "a component surface" includes reference to one or more of such surfaces.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be also understood that when an element is referred to as being "on," "attached" to, "connected" to, "coupled" with, "contacting", "mounted" etc., another element, it can be directly on, attached to, connected to, coupled with or contacting the other element or intervening elements may also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under," "below," "lower," "over," "upper" and the like, may be used herein for ease of description to describe one element or feature's relationship to another element(s) or feature(s) as illustrated in the figures. It will be understood that the spatially relative terms are intended to encompass different orientations of a device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of "over" and "under". The device may be otherwise oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only unless specifically indicated otherwise.

Included in the description are flowcharts depicting examples of the methodology which may be used to direct and control thrust produced from a fully gimballed ducted propeller. In the following description, it will be understood that each block of the flowchart illustrations, and combinations of blocks in the flowchart illustrations, can be implemented by computer program instructions. These computer program instructions may be loaded onto a computer or other programmable apparatus to produce a machine such that the instructions that execute on the computer or other programmable apparatus create means for implementing the functions specified in the flowchart block or blocks. These computer program instructions may also be stored in a computer-readable memory that can direct a computer or other programmable apparatus to function in a particular manner such that the instructions stored in the computer-readable memory produce an article of manufacture including instruction means that implement the function specified in the flowchart block or blocks. The computer program instructions may also be loaded onto a computer or other programmable apparatus to cause a series of operational steps to be performed in the computer or on the other programmable apparatus to produce a computer implemented process such that the instructions that execute on the computer or other programmable apparatus provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware-based computer systems that perform the specified functions or steps, or combinations of special purpose hardware and computer instructions.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve the manipulation of information elements. Typically, but not necessarily, such elements may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," "words", or the like. These specific words, however, are merely convenient labels and are to be associated with appropriate information elements.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

Upon reading this disclosure, those of skill in the art will appreciate still additional alternative structural and functional designs for a system and a process for a fully gimballed ducted propeller through the disclosed principles herein. Thus, while embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

It will also be understood by those familiar with the art, that the invention may be embodied in other specific forms without departing from the spirit or essential characteristics thereof. Likewise, the naming and division of the modules, managers, functions, systems, engines, layers, features, attributes, methodologies, and other aspects are not mandatory or significant, and the mechanisms that implement the invention or its features may have different names, divisions, and/or formats. Furthermore, as will be apparent to one of ordinary skill in the relevant art, the modules, managers, functions, systems, engines, layers, features, attributes, methodologies, and other aspects of the invention can be implemented as software, hardware, firmware, or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

In a preferred embodiment, one or more portions of the present invention can be implemented in software. Software programming code which embodies the present invention is typically accessed by a microprocessor from long-term, persistent storage media of some type, such as a flash drive or hard drive. The software programming code may be embodied on any of a variety of known media for use with a data processing system, such as a diskette, hard drive, CD-ROM, or the like. The code may be distributed on such media or may be distributed from the memory or storage of one computer system over a network of some type to other computer systems for use by such other systems. Alternatively, the programming code may be embodied in the memory of the device and accessed by a microprocessor using an internal bus. The techniques and methods for embodying software programming code in memory, on physical media, and/or distributing software code via networks are well known and will not be further discussed herein.

Generally, program modules include routines, programs, objects, components, data structures and the like that perform tasks or implement abstract data types. Moreover, those skilled in the art will appreciate that the invention can be practiced with other computer system configurations, including hand-held devices, multi-processor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be in both local and remote memory storage devices.

An exemplary system for implementing the invention includes a general-purpose computing device such as the form of a conventional personal computer, a personal communication device or the like, including a processing unit, a system memory, and a system bus that couples various system components, including the system memory to the processing unit. The system bus may be any of several types of bus structures including a memory bus or memory controller, a peripheral bus, and a local bus using any of a variety of bus architectures. The system memory generally includes read-only memory (ROM) and random-access memory (RAM). A basic input/output system (BIOS), containing the basic routines that help to transfer information between elements within the personal computer, such as during start-up, is stored in ROM. The personal computer may further include a hard disk drive for reading from and writing to a hard disk, a magnetic disk drive for reading from or writing to a removable magnetic disk. The hard disk drive and magnetic disk drive are connected to the system bus by a hard disk drive interface and a magnetic disk drive interface, respectively. The drives and their associated computer-readable media provide non-volatile storage of computer readable instructions, data structures, program modules and other data for the personal computer. Although the exemplary environment described herein employs a hard disk and a removable magnetic disk, it should be appreciated by those skilled in the art that other types of computer readable media which can store data that is accessible by a computer may also be used in the exemplary operating environment.

Propulsor

FIG. 1 presents the perspective view of a Propulsor according to one embodiment of the present invention. The propulsor 100, or a fully gimballed ducted propeller as it is also referred to herein, includes a propeller assembly configured, in this embodiment, to rotate clockwise as viewed from an outboard position. A coordinate system in overlayed on the propulsor with the origin residing at the aerodynamic center of the propeller assembly. The X 102 and Z 104 axis orthogonal on the propeller assembly define a thrust plane and the Y axis 106 runs along a nominal thrust axis. The coordinate system is fixed in space in this illustration along with the engine (not shown), driveshaft 110 and vehicle body (not shown), regardless of the propulsor orientation.

Figure 2A:
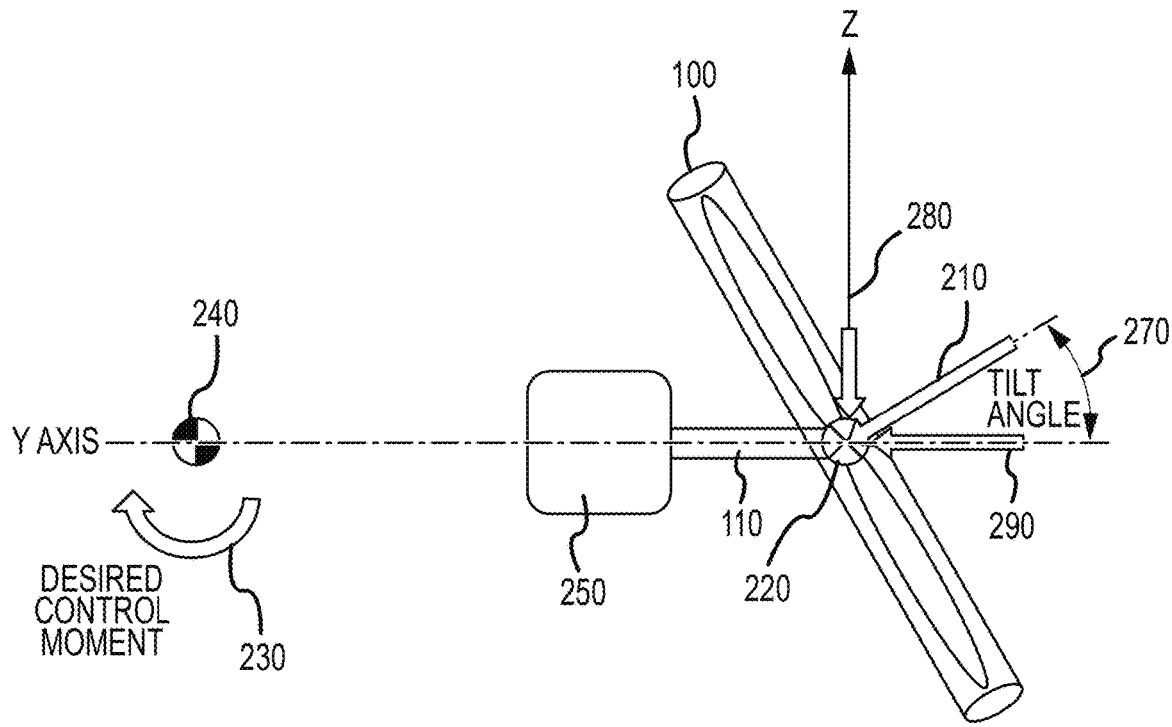
FIGS. 2A and 2B are free body diagrams of a thrust vectoring ducted propeller according to one embodiment of the present invention.
Figure 2B:
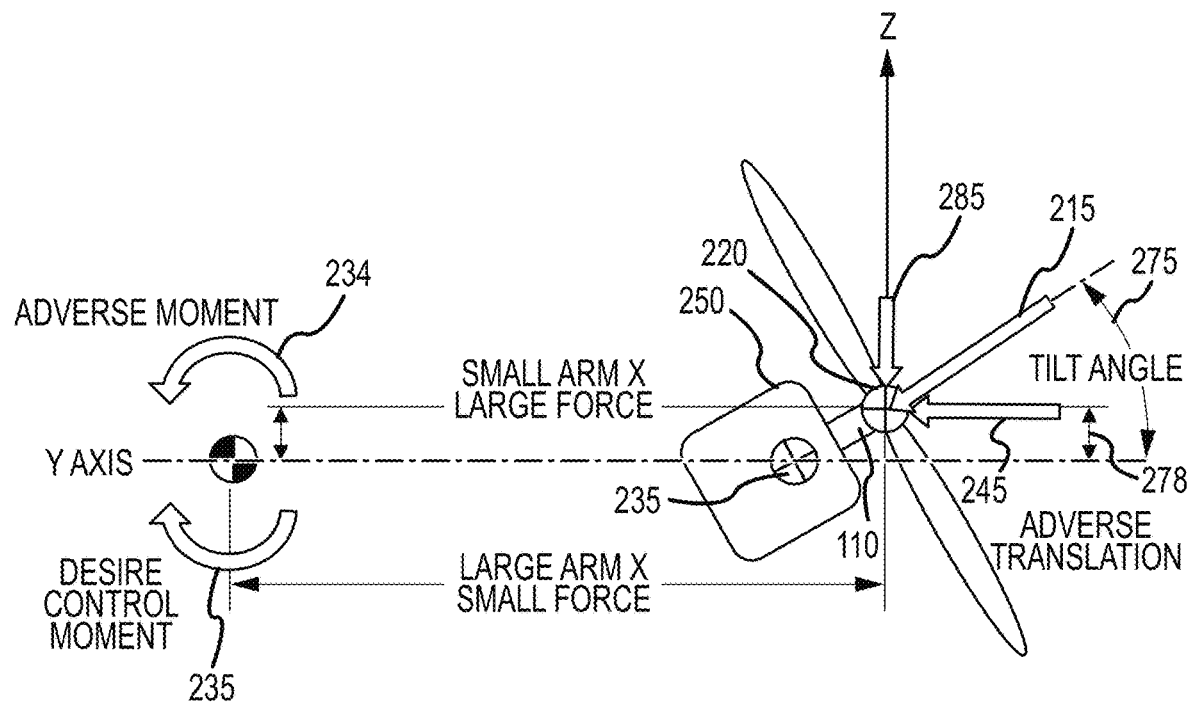

The importance of vectoring a force about the center of thrust can be seen with reference to FIGS. 2A and 2B. FIG. 2A is a free-body diagram of one embodiment of the present invention showing thrust 210 (or load) generated by the propulsor 100 being directed through the aerodynamic center 220 of the propeller assembly. Assume, for the purpose of FIGS. 2A and 2B that a desired clockwise control moment 230 in the Y-Z plane at the vehicle center of gravity 240 is desired. As shown the aerodynamic center 220 of the propeller assembly coincides with the propulsor's pivot point. FIG. 2A is a side view of the propulsor viewing the Y-Z plane. The propulsor is deflected about the pivot point/ aerodynamic center 220 about the X axis.

As shown, the engine 250 and driveshaft 110 are fixed with respect to the vehicle's center of gravity (CG) 240 and their position along the Y axis. The Propulsor 100 is shown pivoted at an angle 270 about its pivot point at the center of thrust/aerodynamic center 220. The thrust vector 210 is deconstructed into its two components, the lateral component which creates the desired control moment 230 from the angular deflection 270 acting about the CG 240, and the thrust component 290 which remains aligned along the vehicle centerline through the CG 240. In doing so the Propulsor 100 is effective for both propulsion and control; as the moment 230 created to control the vehicle is varied by pivot angle in any plane, the direction of the thrust vector remains unperturbed.

FIG. 2B provides a direct comparison to the present invention with a similar diagram of a tilting motor-propeller pair, as would be known by one of reasonable skill in the relevant art. This diagram presents the U-Z plane of view looking directly into the tilt axis, X. The X axis of tilt is located inboard of the spinning propeller and is typically located at the centroid of the engine 235, driveshaft, propeller assembly grouping to keep control loads balanced. The propeller creates a force 215 acting at the propeller's center of rotation 220 (center of thrust). The force is deconstructed into a lateral 285 and translational 245 component. As shown, the offset 278 tilt axis from the center of thrust creates an adverse translation force 245 acting at the center of thrust 220 apart 278 from the longitudinal Y axis. The result is an adverse moment 234 that works against the desired control moment 235 generated by the lateral force vector 285. As the two moments vary disproportionately with angle, tilting the motor-rotor pair becomes increasingly ineffective at higher tilt angles, limiting its usefulness for vehicle control.

Figure 3:
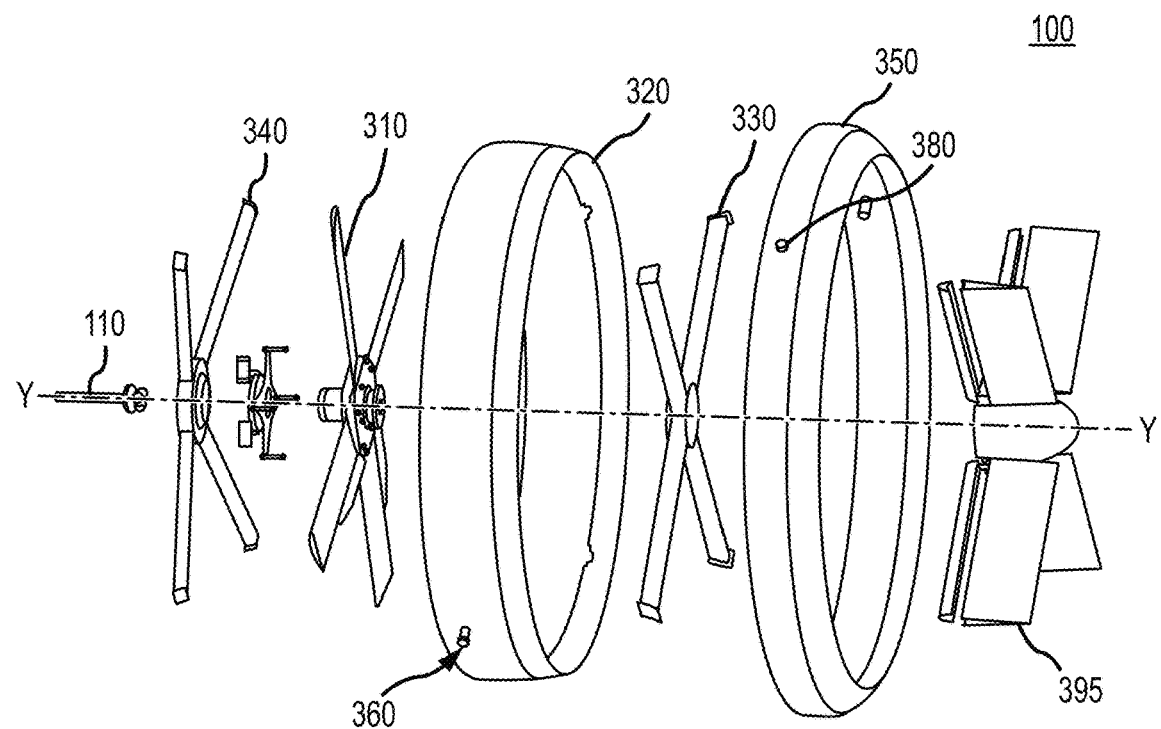
FIG. 3 shows an exploded view of a thrust vectoring ducted propeller according to one embodiment of the present invention.
Figure 4:
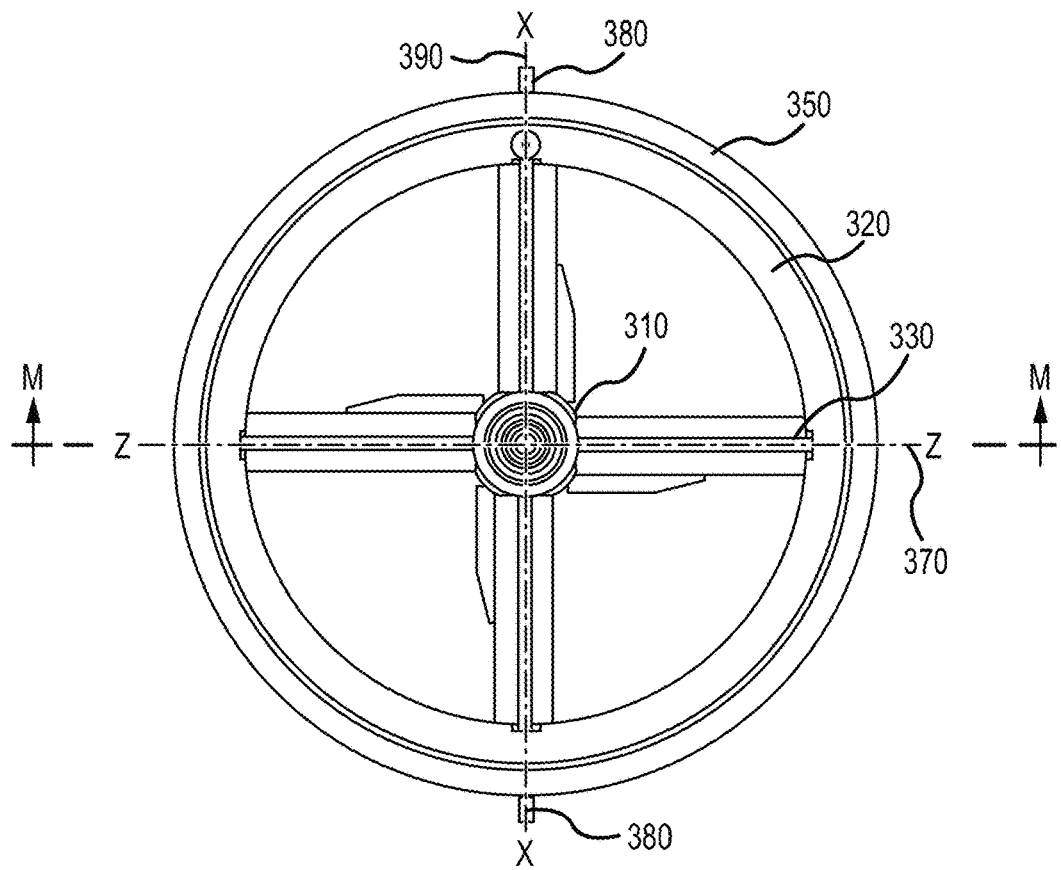
FIG. 4 is an end inboard view of a thrust vectoring ducted propeller according to one embodiment of the present invention.
Figure 5:
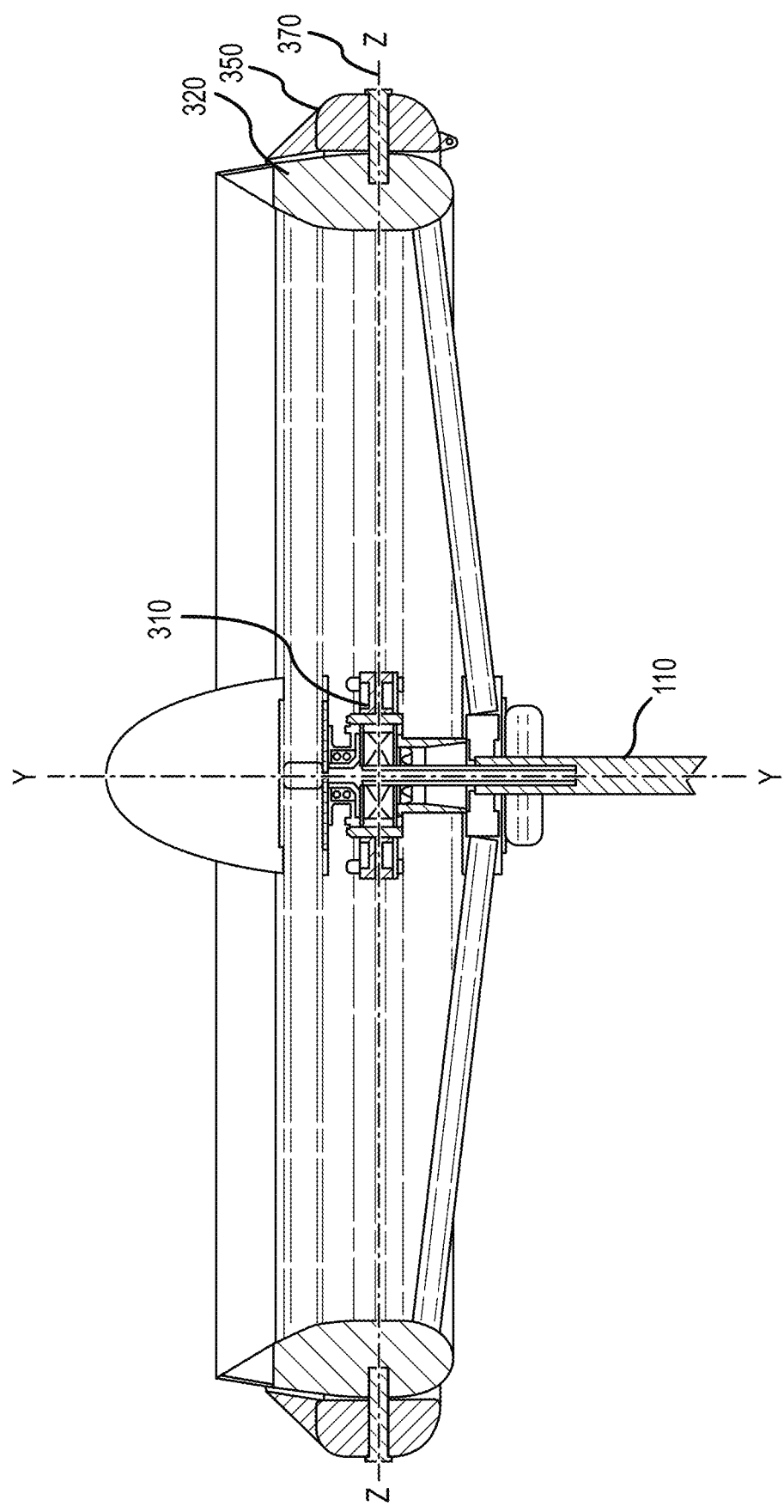
FIG. 5 is a section view of the thrust vectoring ducted propeller of FIG. 4.

FIG. 3 is an exploded view showing the primary components of the Propulsor 100, according to one embodiment of the present invention. FIG. 4 presents an end view of the propulsor 100 with FIG. 5 being a cross-section view of the Propulsor at the M-M line.

Figure 6:
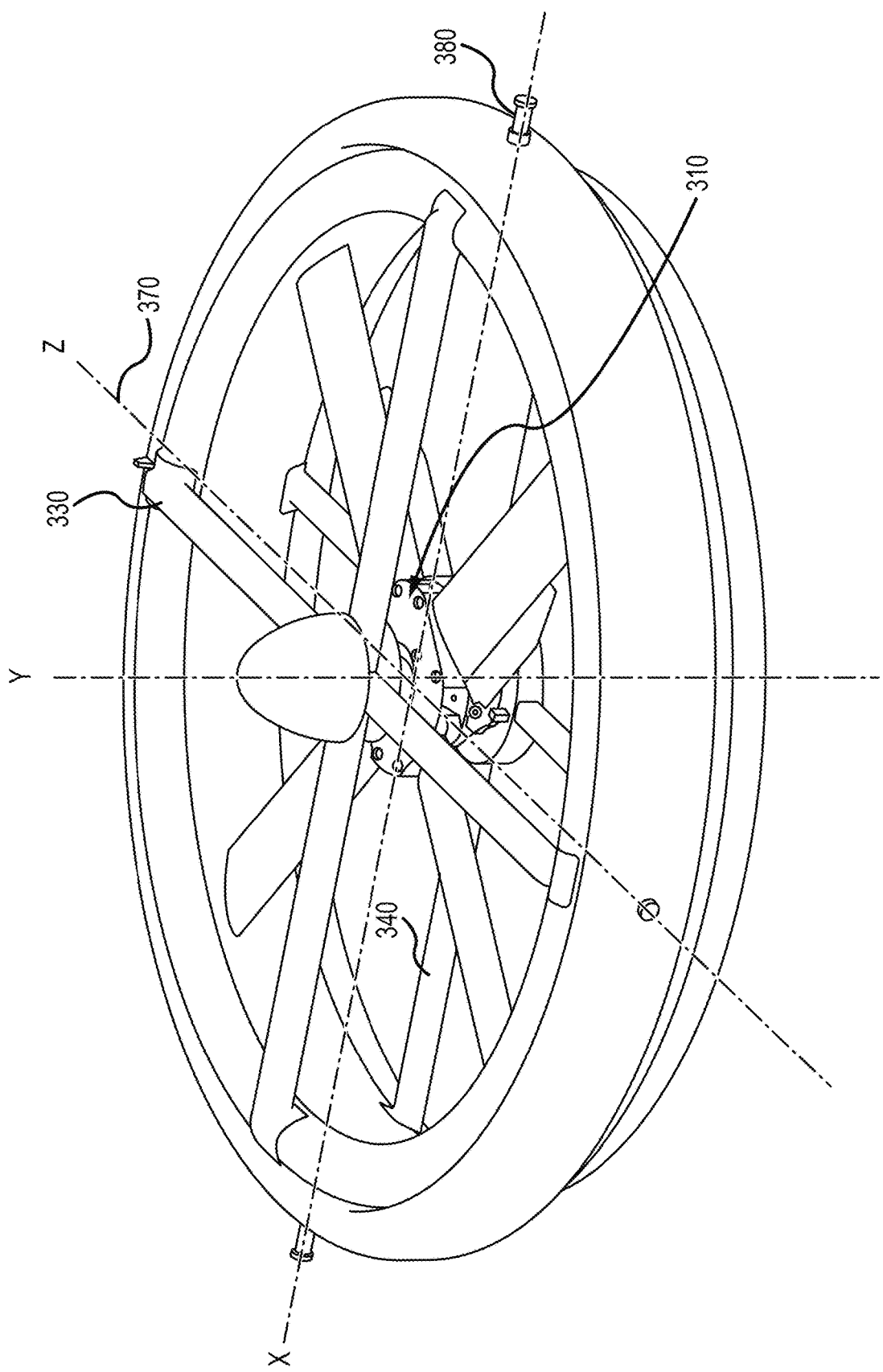
FIG. 6 is a top perspective view of a thrust vectoring ducted propeller including propeller blade trailing edges according to one embodiment of the present invention.

With reference to FIG. 3, a Propulsor 100, according to one embodiment of the present invention, includes a propeller assembly 310, a propeller duct 320, an outboard strut 330, an inboard strut 340, a gimbal assembly 350, and a drive shaft 110 coupled to a constant velocity joint (not shown). FIG. 6 provides a perspective view of the configuration of FIG. 3.

The propeller duct 320 is fixedly attached to the outboard strut 330 and inboard strut 340, both of which center the propeller assembly 310 within the duct 320. The propeller assembly 310 includes a plurality of propeller blades (four are shown in this embodiment) located axially at the centroid of the propeller duct.

The outboard strut 330 serves as the primary load path for a thrust load (translational) generated by the propeller assembly 310. Both strut assemblies carry the radial loads back to the duct. The components are lightweight and stiff manufactured from various aerospace materials as would be well known to one or ordinary skill in the relevant art and will not be discussed further. The propeller assembly 310 is located at the centroid of the propeller duct 320 providing good tracking between the duct and propeller to maintain tight tip clearances while the assembly is dynamically moved to steer the thrust vector.

The duct 320 and strut assemblies 330, 340 serve as a shroud and support for the propeller assembly 310. The propeller duct 320 is similar in geometry and construction to any standard ducted-fan structure, with the exception that its outboard surface is contoured slightly to nest with a gimbal assembly 350. The propeller duct 320 provides known benefits of ducted fans including improved propeller efficiency and noise reduction.

The entirety of the propeller duct 320, including the propeller assembly 310 and both struts 330, 340, is gimballed within a gimbal assembly 350. The propeller duct 320 rotationally couples within the gimbal assembly 350 at a pivot interface 360 enabling the propeller duct 320 assembly to pivot about a single axis of rotation known as the propeller pivot axis 370. The gimbal assembly 350 includes two attachment points 380 (gimbal pivot interface) at which the gimbal assembly 350 and the inclusive propeller duct 320 are coupled to the vehicle and rotatable about a propeller gimbal pivot axis 390. The propeller gimbal pivot axis 390 is independent of the propeller pivot axis 370. In the embodiments shown in FIGS. 3-6, the propeller pivot axis 370 and the propeller gimbal pivot axis 390 are perpendicular. In other embodiments of the present invention additional gimbal assemblies with alternative orientations are possible and contemplated and deemed withing the scope of the present invention.

The gimbal pivot interface 380 and the pivot interface 360 create a thrust vectoring ducted propeller that is fully dual axis gimbaled. The propulsor shown in FIGS. 3-6 further includes a plurality of guide vanes 395 and a guide vane controller (not shown) configured to compensate for gyroscopic precession, as discussed hereafter.

As shown in FIGS. 3-6 the gimbal assembly 350 attaches rotatably to the propeller duct 320 in two places along the Z axis that passes through the center of the propeller assembly 310. The gimbal assembly 350 nests with the outboard surface of the propeller duct 320 and is of similar shape and construction. The gimbal assembly 350 is the load path that carries the forces from the propeller assembly 310 and propeller duct 320 into the fuselage to propel and steer the craft.

The Propulsor assembly 310 can be configured in either the puller or pusher configurations by reversing the orientation of the propeller duct 320, gimbal assembly 350, and propeller. The outboard strut 330 remains outboard of the craft thereby transferring thrust loads into the airframe, and the inboard strut assembly 340 remains on the inboard drive side, to accommodate gimbaling about the drive shaft. The direction of rotation of the propeller blades within the propeller assembly is independent of the mounting and can be in either direction.

Constant Velocity Joint

The propellers of the propeller assembly 310 rotate with the driveshaft 110, and pivots as associated with the propeller duct 320 and gimbal assembly 350. The propeller assembly 310 consists of any number of propeller blades, fixed, in one embodiment, in pitch to the hub. A receiver housing 710, as shown in FIGS. 7A and 7B, resides at the center of thrust (aerodynamic center) 750 of the propeller assembly allowing angular movement in two dimensions of the propulsor while maintaining/delivering a rotational load through a constant velocity joint 720.

Figure 7C:
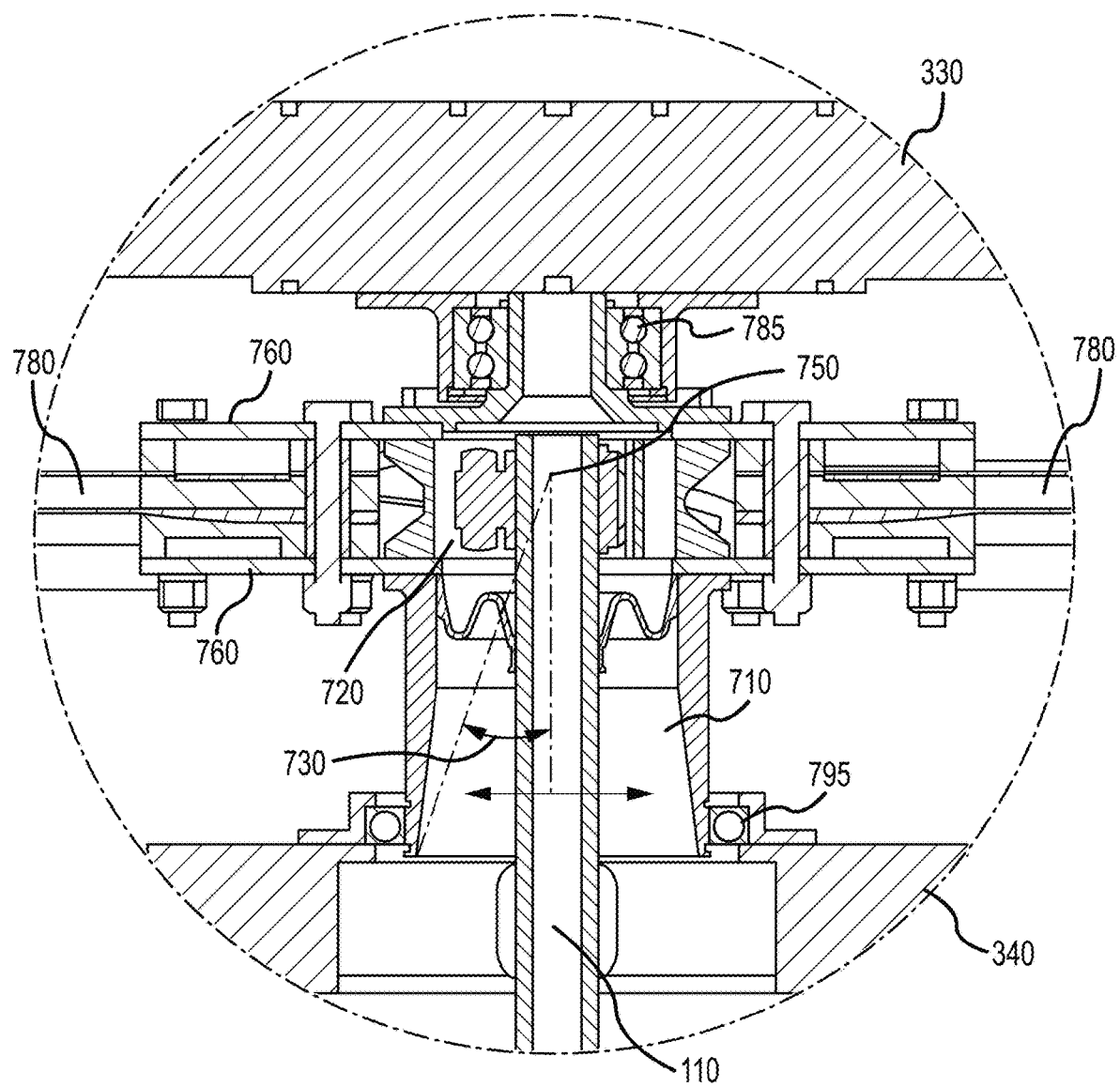

A constant velocity joint (CV joint) 720 is a mechanical coupling that allows two shafts to rotate freely (without any appreciate increase in friction or backlash) and compensate for the angle between the two shafts, within a certain range, to maintain the same velocity. Front wheeled vehicles use CV joints to transfer engine power to the wheels even as the angel of the driveshaft varies due to operation of the suspension. FIGS. 7A and 7B illustrate a tripod joint 720 (a type of CV joint) coupling the drive shaft 110 to the propeller assembly. FIG. 7A illustrates the side cut away view of the propulsor of FIG. 5 at an angle with the Z axis. While the propulsor 100, including the propeller assembly is at a displaced angle, the drive shaft 110 remains aligned with the Y axis of the vehicle. FIGS. 7B and 7C are enlarged views of the interaction between the tripod joint and the propeller assembly.

A tripod joint in FIGS. 7A, 7B, and 7C is a form of constant velocity joint that transfers uniform torque and constant speed, despite changes in angle, enabling consistent transmission of power. Tripod joints are stronger and more compact than ball-type constant velocity joints and possess noise and vibration advantages due to their lower plunging resistance. They have less angular travel capability than ball-type constant velocity joints. In the embodiment shown in FIGS. 7A and 7B, the tripod assembly 720 consists of three spherical rollers on a spider fitting. The spider fitting is splined axially to mate with the drive shaft with three arms extending perpendicular to the shaft axis-symmetrically, 120 degrees apart. The rollers ride on needle bearings allowing them to rotate freely about the axis of each arm. An important attribute of the tripod joint is its axial freedom of travel while transmitting torque to accommodate dynamic structural deflections of the propulsor and craft. One of average skill in the relevant art will appreciate that other CV joints may be employed with the present invention without departing from the scope and novelty of the propulsor described herein.

As shown in FIG. 7B, the tripod assembly 720 fits inside a receiver housing 710 associated with the propeller assembly 310 with three matching grooves that completes the joint. The rotational motion of the shaft is transmitted through the rollers and against the grooves in the receiver housing. The grooves allow the joint to operate at dynamically varying angles to the receiver housing, while transmitting torque at high rotational speeds.

The axial freedom of the tripod joint accommodates the dynamic motion of the propulsor from aerodynamic and thrust loads. In one embodiment of the present invention the axial freedom 730 of the drive shaft with respect to the propeller assembly is ±15 degrees. In other embodiments the angular axial freedom 730 is as large as ±30 degrees. Other degrees of freedom of movement of the propulsor are possible and contemplated as being within the scope of the present invention. The receiver housing of the tripod (CV) joint is mounted at the aerodynamic center 750 of the propeller assembly 310, within a propeller hub. The propeller hub includes two hub plates 760 connecting a plurality of propeller blades 780 extending radially outward. A main bearing 785 is interposed between the propeller assembly 310 and the outboard strut 330 to convey the load generated by the propeller assembly to the outboard strut 330. The main bearing 785 carries the primary thrust load and radial loads from the rotating propeller (propeller assembly) 310 into the non-rotating outboard struts and thereafter to the vehicle. Similarly, a secondary bearing 795 interposed between the propeller assembly 310 and the inboard strut 340 conveys radial loads but lacks and thrust or translational loads.

Mounted to the inboard plate of the hub is a slider fitting that rotates with the hub and connects to the non-rotatable inboard strut assembly through the secondary bearing that carries radial loads into the non-rotating inboard struts. The slider fitting is oversize in bore to allow the tripod to pass through it on installation and provide rotational and angular clearance to the driveshaft operationally. The slider fitting is, in one embodiment, oversized in length to accommodate a collective assembly that traverses its length.

The tripod joint and associated housing are mounted in the free stream of flow, and away from the heat of the engine. Any heat generated by the tripod bearing (CV joint) conducts through the hub into the exposed bearing housings on each end, allowing it to operate and high speeds and moderate angles without excessive wear or thermal stress.

Thrust Magnitude Control

Figure 8:
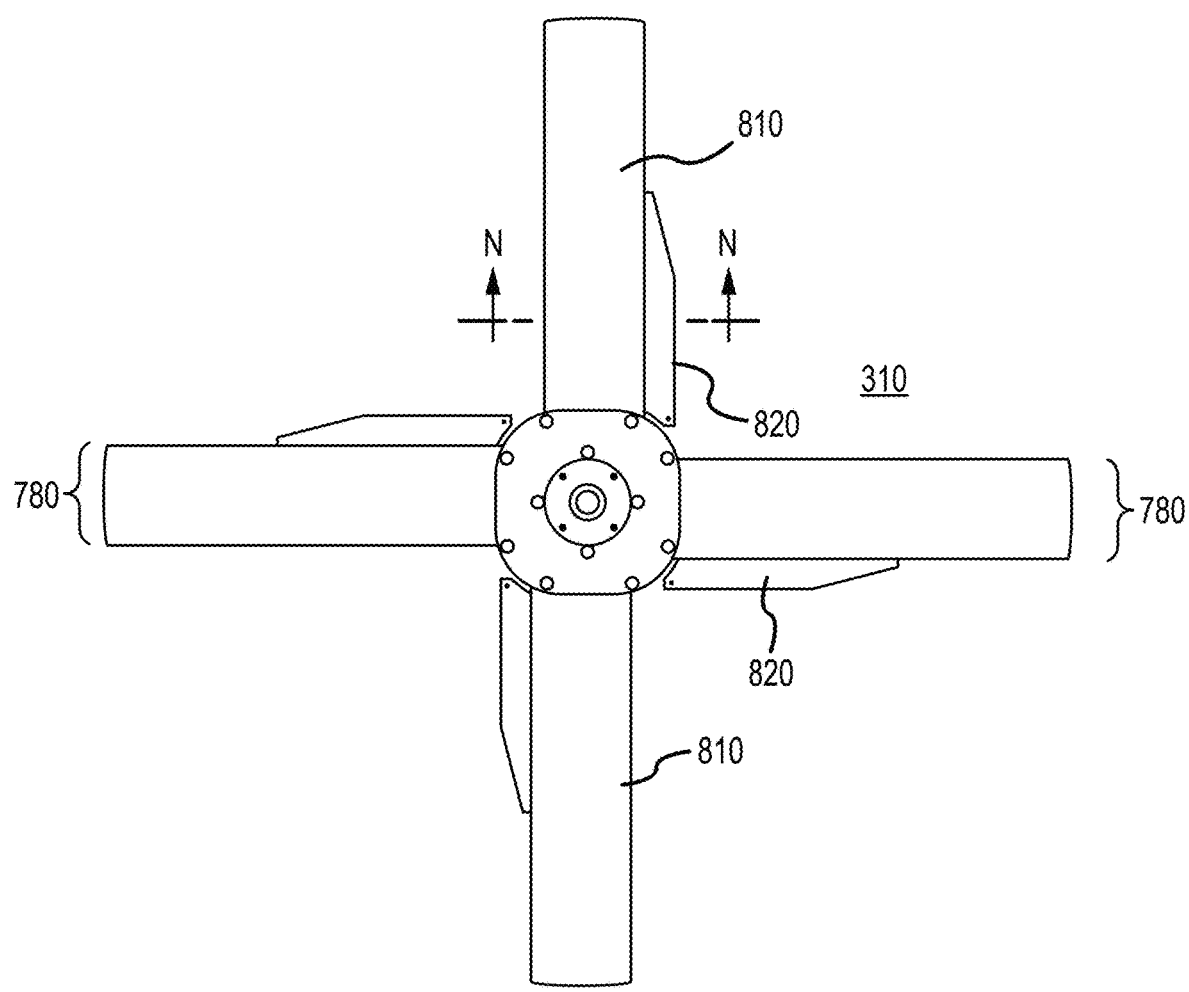
FIG. 8 is a top exemplary view of a plurality of propeller blades as would be found in a propeller assembly of a thrust vectoring ducted propeller according to one embodiment of the present invention.

The current state of the art of varying the thrust of a fixed pitch propeller is to change its rotational speed, which is not precluded in the current invention. FIG. 8 shows a preferred embodiment of the present invention having a four bladed propeller assembly 310. According to one embodiment of the present invention and as show in FIGS. 8 and 9 each blade 780 includes a blade main body 810 and a modifiable trailing edge 820 extending from the blade root located at the hub to approximately two-thirds the span of the blade. The blade main body 810 includes a trailing edge 820 appendage by which thrust can be modified while maintaining a constant propeller rotation speed or used in combination with revolution speed variances. In one embodiment of the present invention each propeller blade 780 in the propeller assembly has no twist enabling the inclusion of a lightweight surface hinge. Each blade is non-tapered to create a wide chord at the tip which is curved to minimize the gap between the tip and the propeller duct. The airfoil section and blade pitch are selected for optimal performance within the propeller duct. In one embodiment each propeller blade has a hollow core 830 with an integral spar 840 to minimize its rotational inertia.

Figure 9:
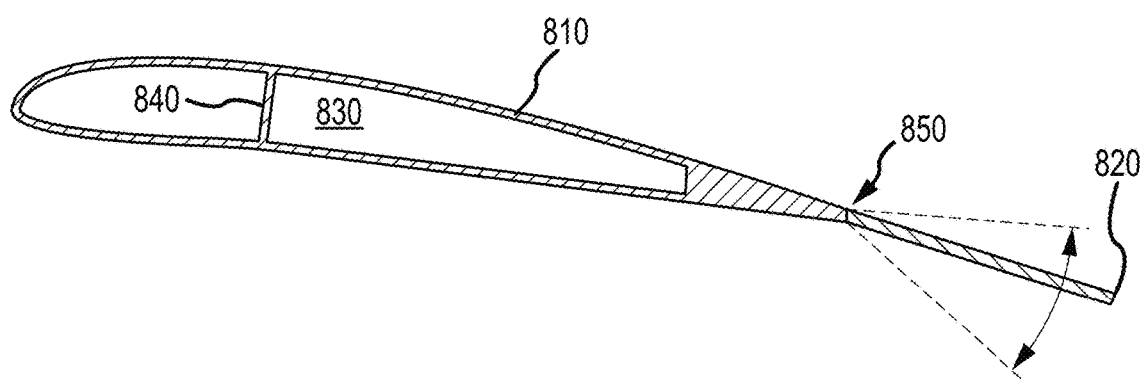
FIG. 9 is a cross section of a propeller blade with a hinged trailing edge for a thrust vectoring ducted propeller according to one embodiment of the present invention.

According to one embodiment of the present invention, the trailing edge 820 can be coupled to the blade by a strip hinge 850 or the like as shown in FIG. 9. In the version of the present invention shown in FIG. 9 the hinge 850 permits movement of the trailing edge up to 15 degrees in the direction of the upper surface of the blade, and 25 degrees in the direction of the lower surface. Actuation of the trailing edge changes the thrust produced by the blade by varying its camber and coefficient of lift at the root and midspan of the propeller blade without changing the pitch of the blade itself, and importantly, its interaction with the propeller duct.

The movable trailing edge modifies camber of the propeller blades 780 inflight to provide efficient VTOL and forward flight, and compensating for engine lag, which is particularly useful with turbine engines or during VTOL landings.

Figure 10:
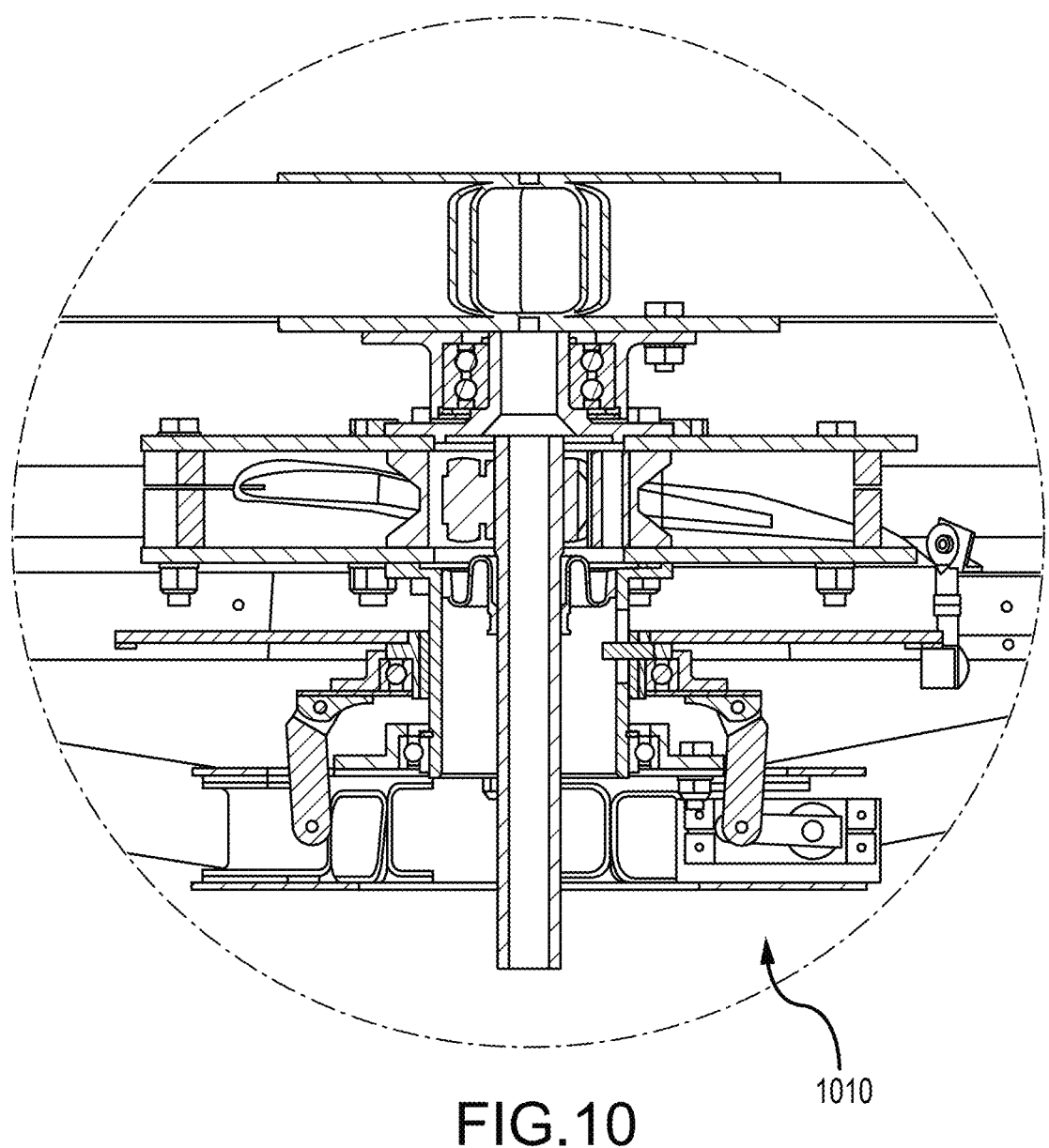
FIG. 10 is a detailed side view of the propeller assembly and CV joint including a propeller blade trailing edge collective for a thrust vectoring ducted propeller according to one embodiment of the present invention.

A collective actuator assembly 1010, according to one embodiment of the present invention, shown in cross-section in FIG. 10, moves the trailing edges 820 of the blades about their angular range in unison, i.e., collectively. The collective actuator assembly 1010 is actuated to travel linearly along the length of the slider fitting by two opposing servos. The collective actuator assembly 1010 is split into two sub-assemblies sharing a common despun ball bearing. The spun portion of the collective actuator assembly rotates with the propeller and slider fitting. It interfaces on the slider fitting with a linear bearing, and a pin that fits within the slot on the slider to transmit the torque of rotation, insuring they spin together. The spun section of the collective actuator assembly includes a spider plate with spherical rod-end linkages connecting to the trailing edge on each of the propeller blades.

The despun portion of the collective assembly does not rotate. It is affixed to the spun section by the common despun ball bearing. A despun plate extends radially outward to connect with two opposing yoke fittings driven by separate servos in the hub of the inboard strut assembly. The yoke fitting's interface with the stationary servos restrains the despun section from rotating with the spun section. Command of the drive servos moves the entire collective assembly axially along the length of the slider fitting, ultimately moving the propeller blade flaps.

Figure 11A:
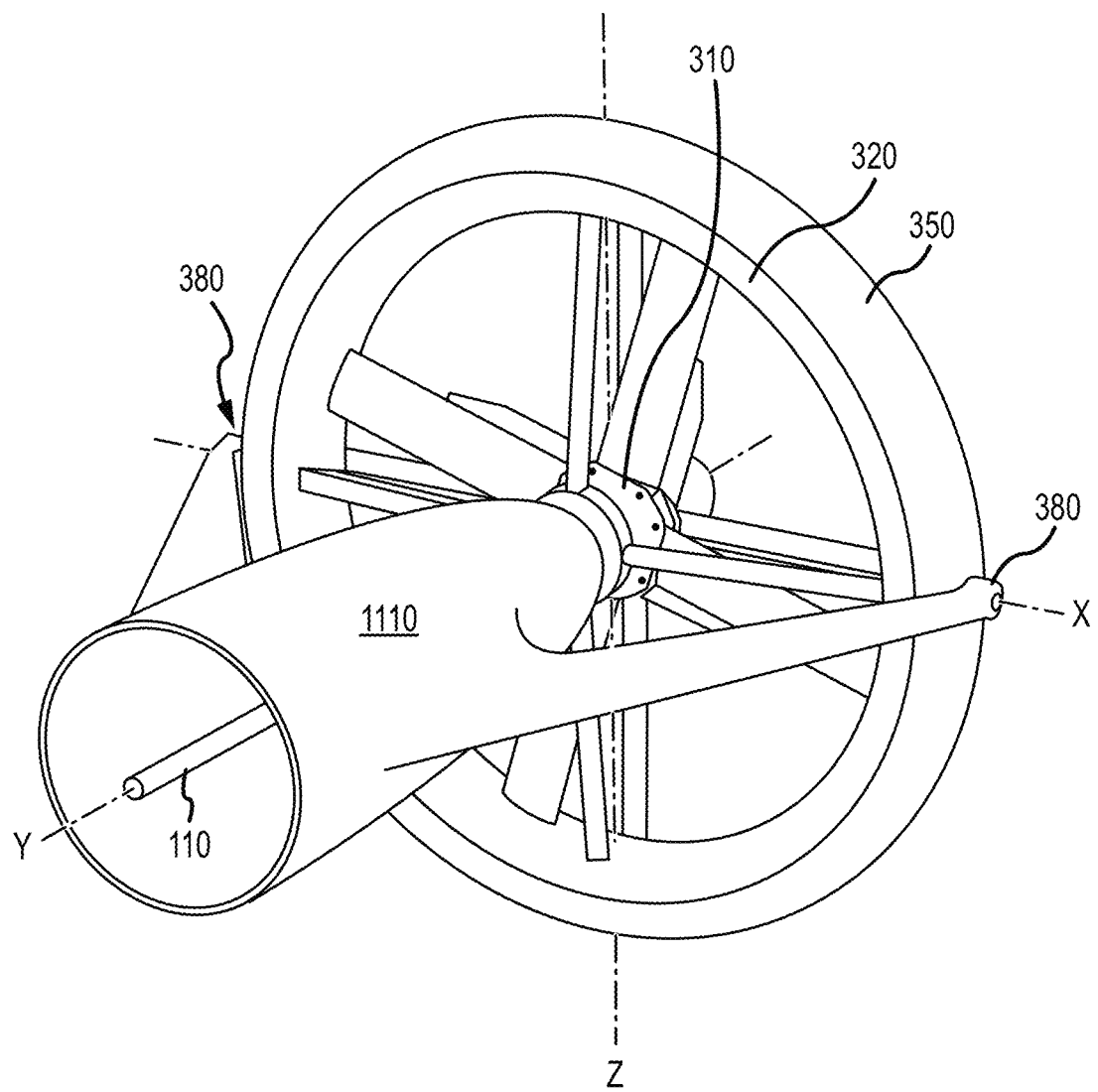
FIGS. 11A-11I provide perspective views of a thrust vectoring ducted propeller according to one embodiment of the present invention in various directional thrust configurations.

In operation, the thrust vector is pointed by the vehicle with pushrods to the propeller duct and gimbal assembly. FIGS. 11A-11I present various deflection configurations of the present invention as related to a notional craft. FIG. 11A shows the gimbal assembly 350 connected rotatably to the fuselage 1110 of the notional craft at the gimbal pivot interface 380 in two places along the X axis. In this example the gimbal pivot interface 380 is in the same plane and orthogonal to the pivot interface along the Z axis. A line between the gimbal pivot interface points and the pivot interface points passes through the center of the propeller assembly 310. (The X axis is chosen in this example for simplicity, and it should be understood the connection could be on any axis in the XZ plane.)

Figure 11B:
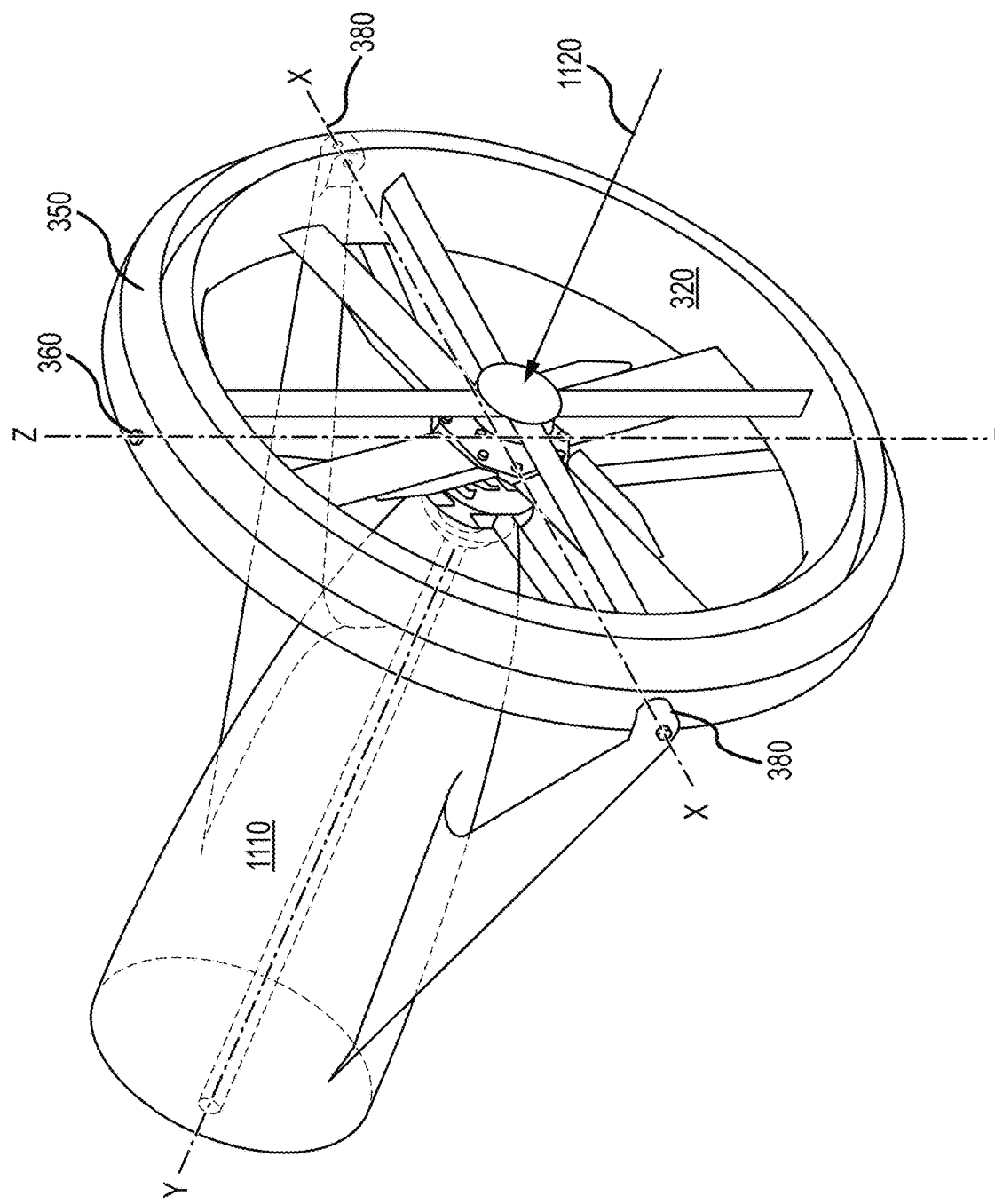
Figure 11C:
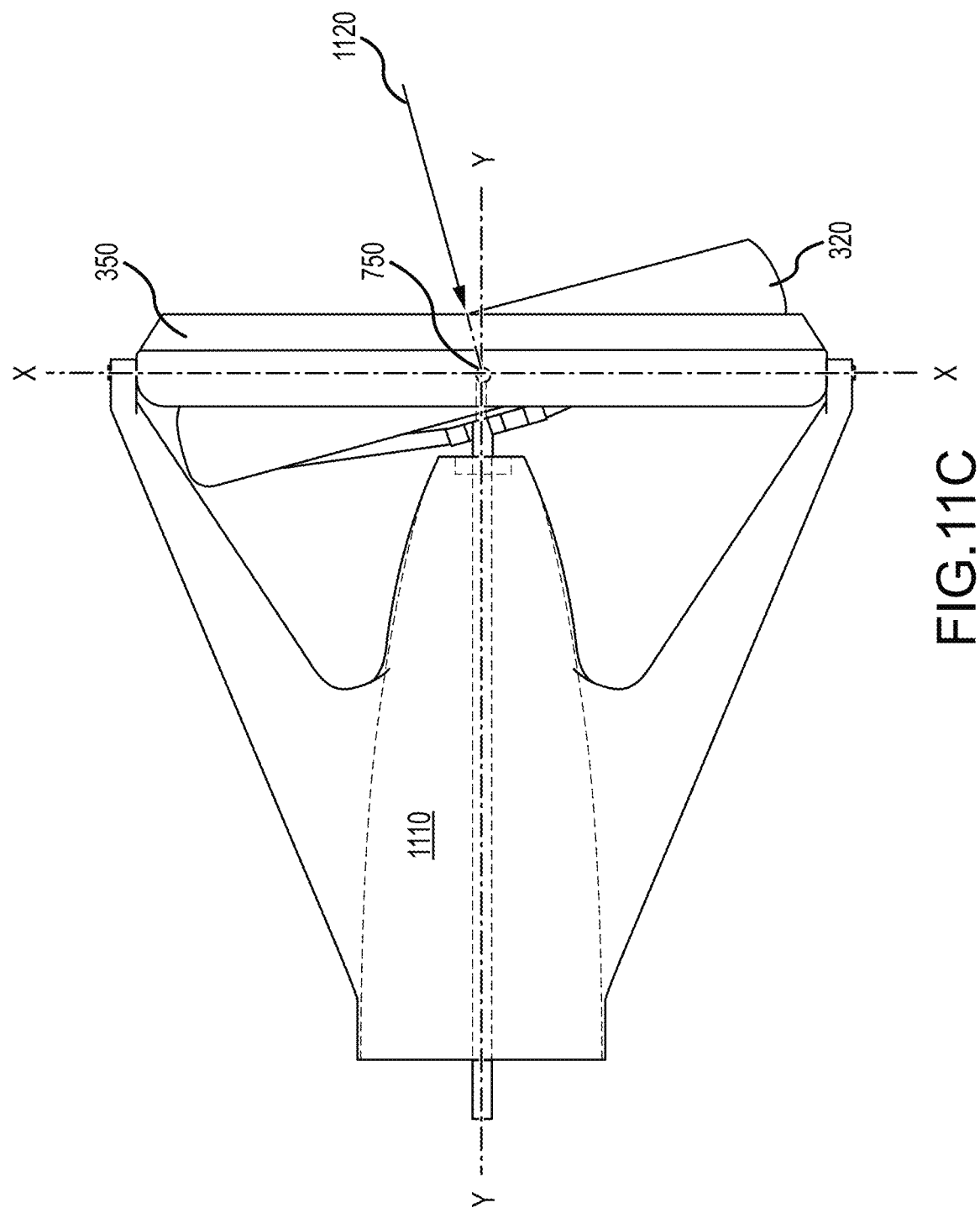
Figure 11D:
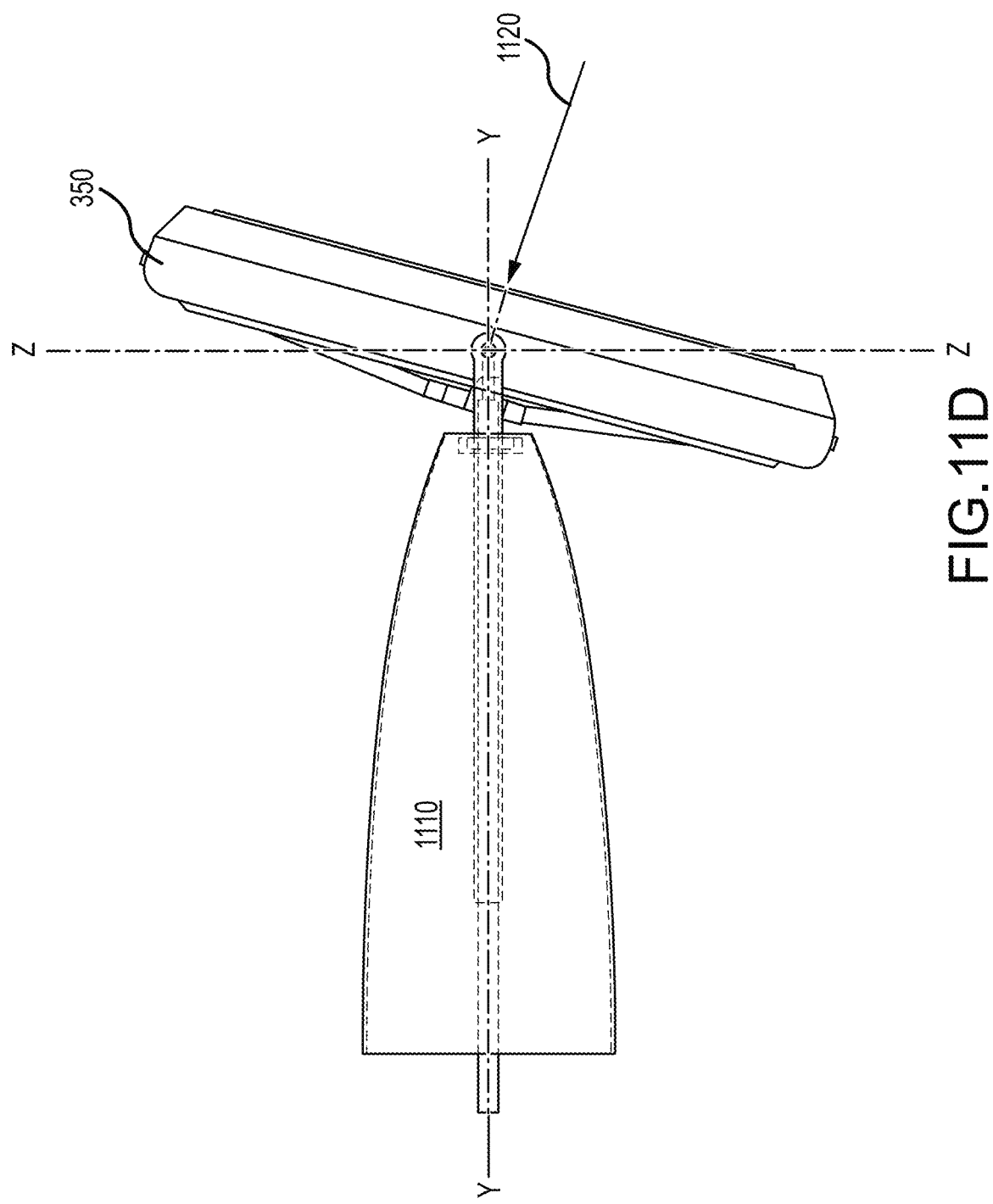
Figure 11E:
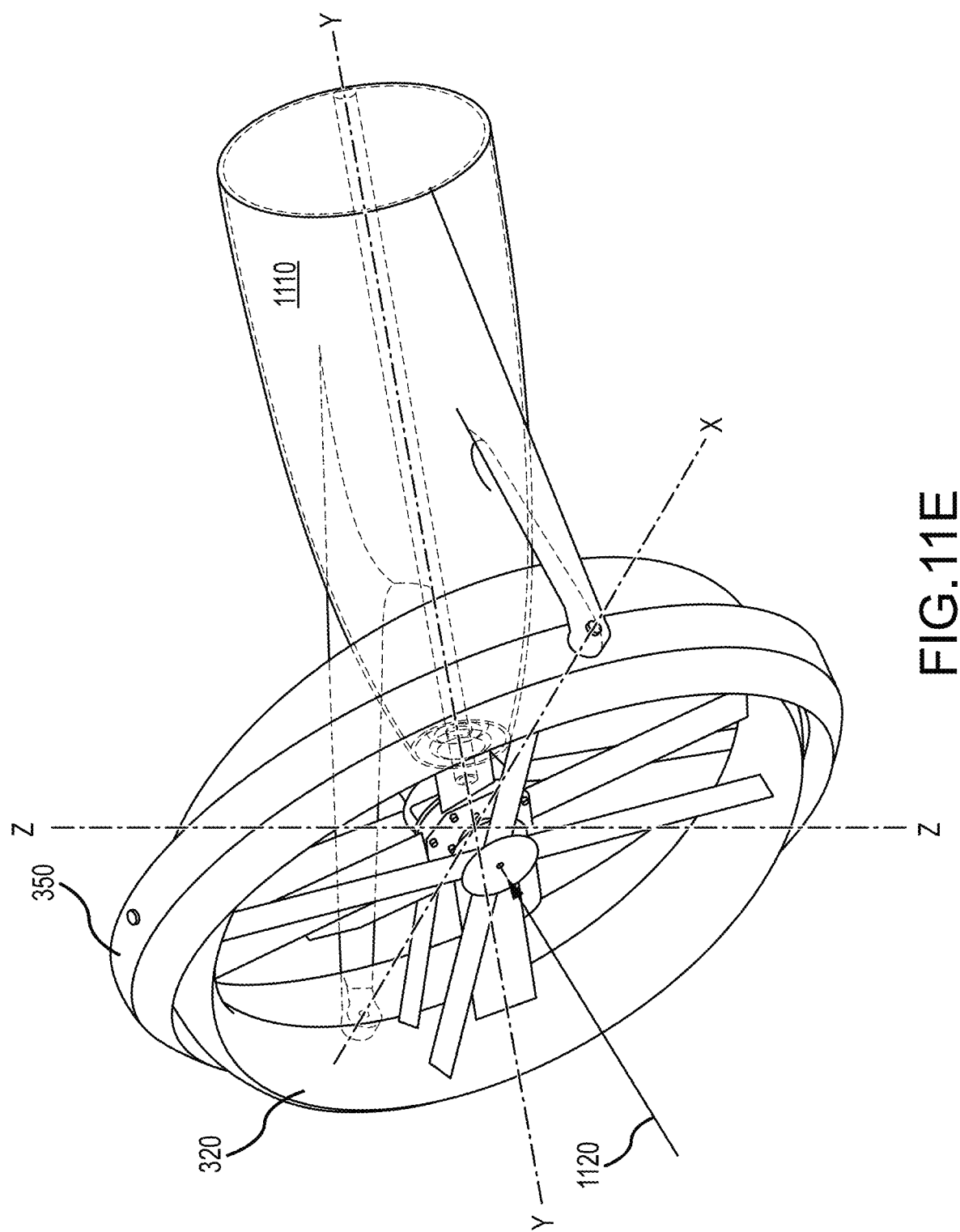
Figure 11F:
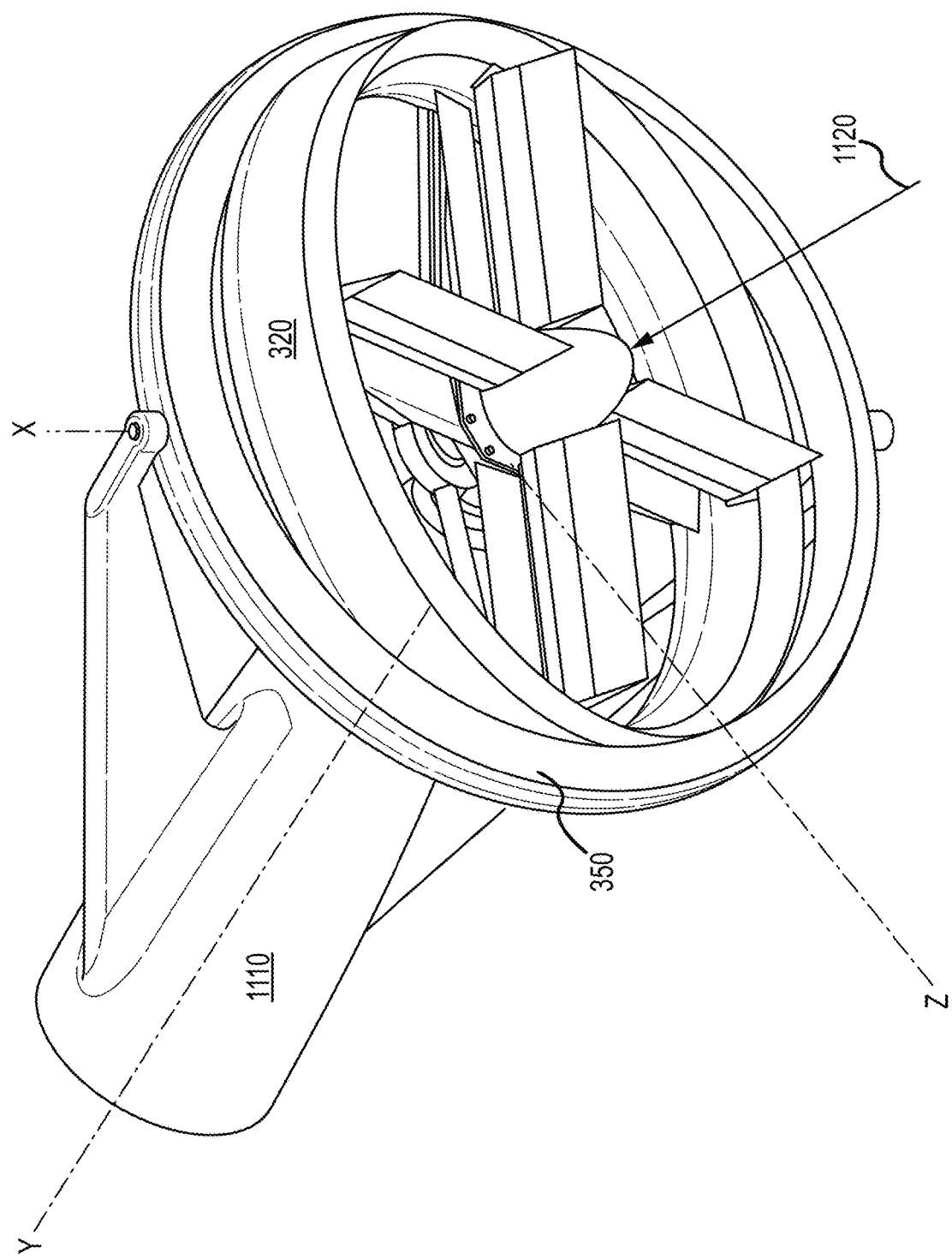
Figure 11G:
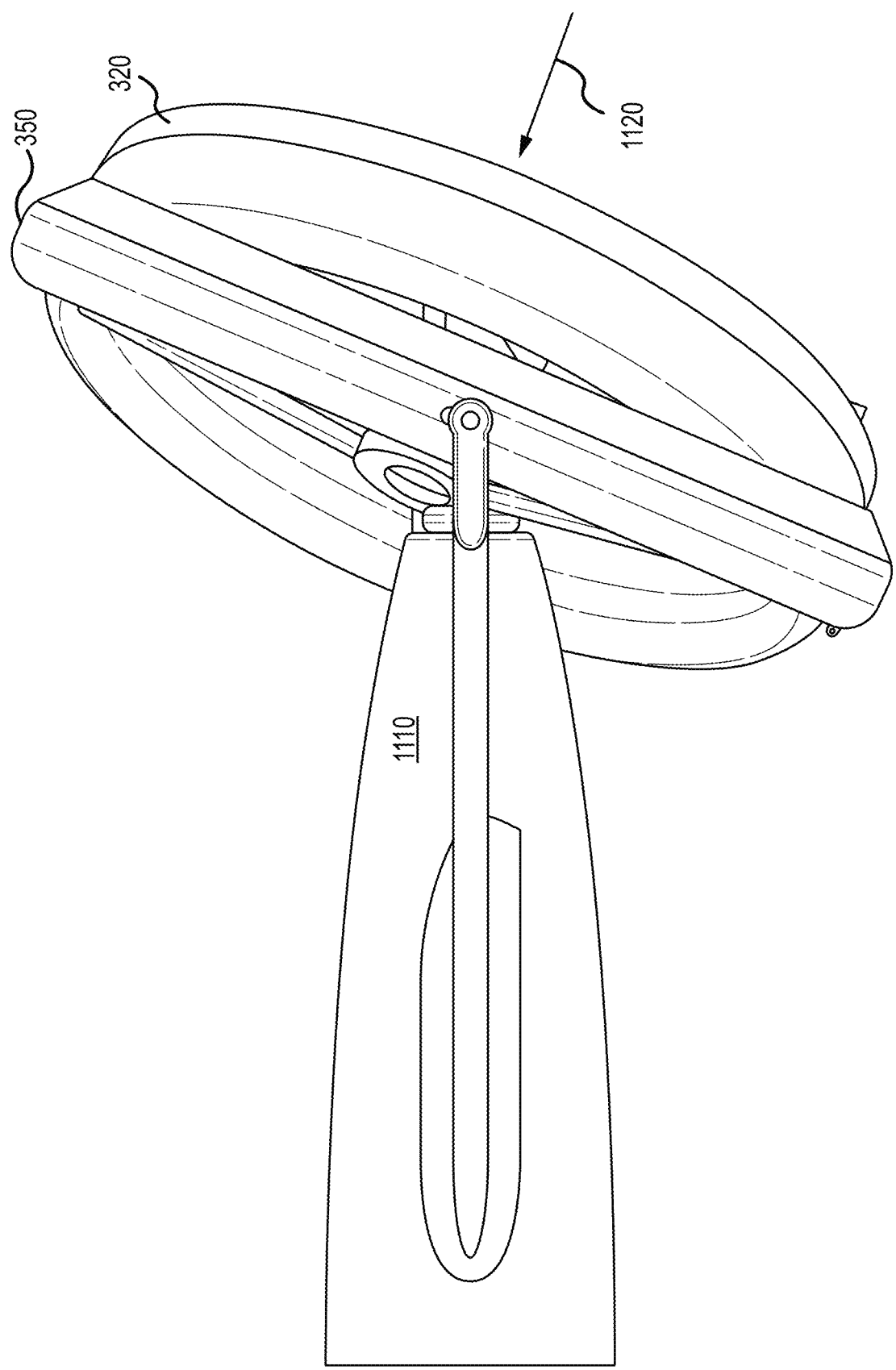
Figure 11H:
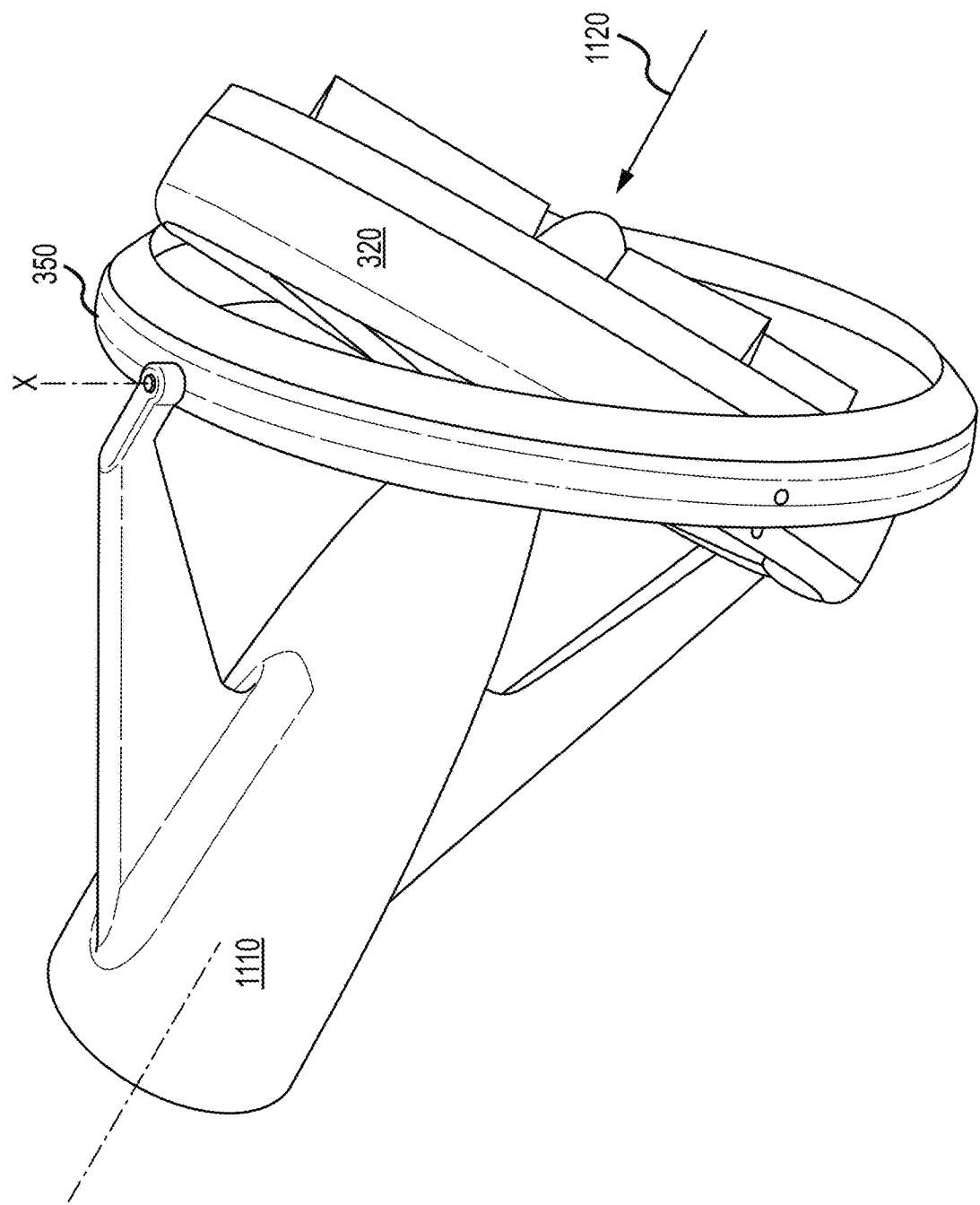
Figure 11I:
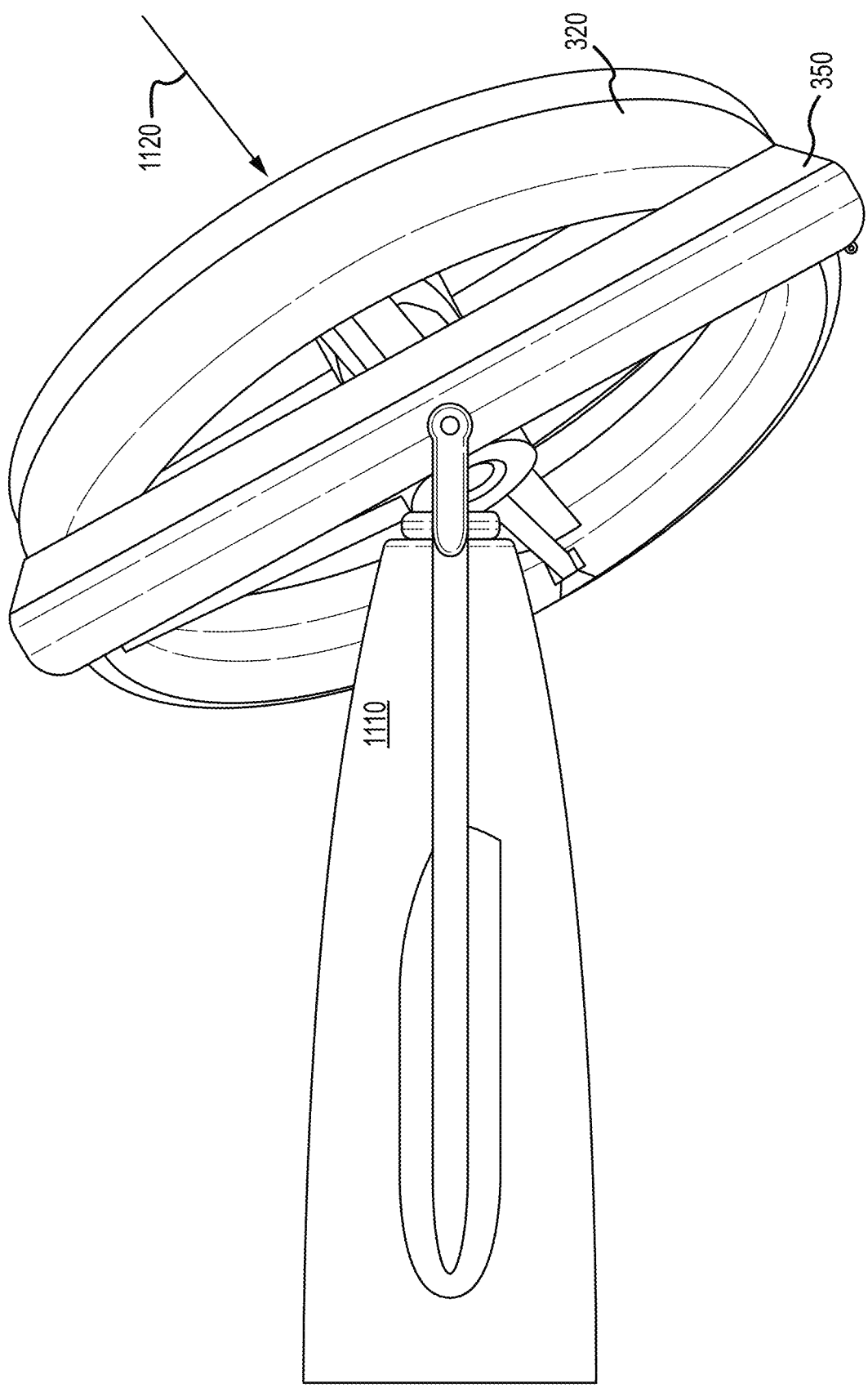

FIG. 11B is the reverse isometric of the Propulsor of FIG. 11A with the thrust vector 1120 shown in the nominal propulsive position directly through the Y axis. FIG. 11C shows the propeller duct 320 and the inclusive propeller assembly 310 tilted about the X axis with a corresponding tilted thrust vector 1120. Note again the thrust vector is directed through the aerodynamic center 750 of the propeller assembly 310. FIG. 11D shows the gimbal assembly 350 tilted about the Z axis, tilting with it the propeller duct 320, propeller assembly 310, and thrust vector 1120. FIG. 11E shows the propeller duct 320 and gimbal assembly 350 tilting in coordination to point the thrust vector 1120 in any desired direction with respect to the Y axis. FIGS. 11F-11I provide various depictions of independent movement of the propeller duct 320 and gimbal assembly 350 resulting in thrust vector 1120 control.

Figure 12:
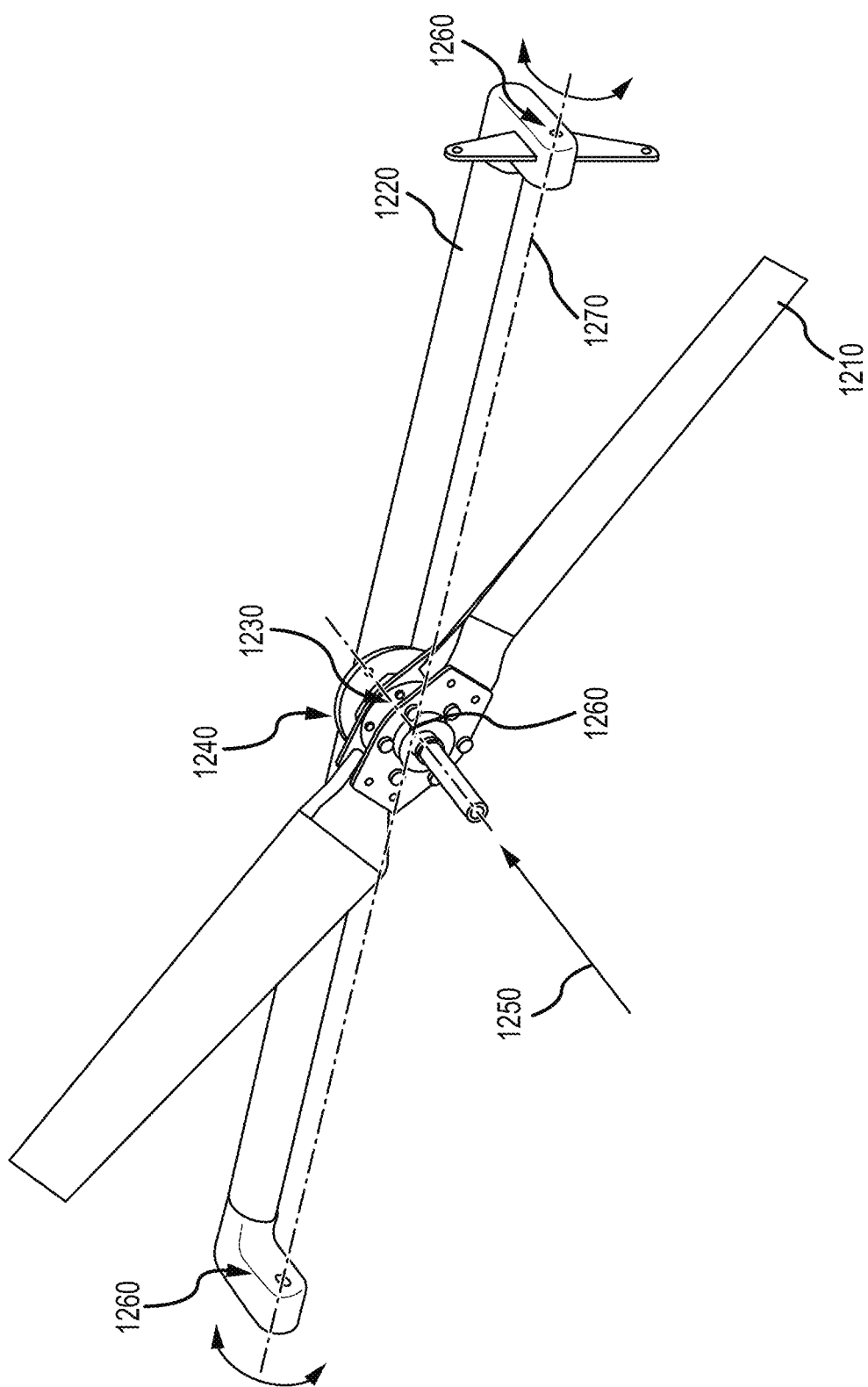
FIG. 12 is a perspective view of an unshrouded (free tip) thrust vectoring propeller according to one embodiment of the present invention.

FIG. 12 shows a perspective view of a directed thrust free tip propeller 1210 according to another embodiment of the present invention. Interposed between the outboard strut 1220 and the propeller assembly 1230 is a main bearing 1240. As the propeller blades rotate 1210 and thrust is produced the axial load produced by the propeller assembly is directed through the aerodynamic center 1260 and conveyed to the vehicle via the outboard strut 1220/main bearing. The strut 1220, and thus the propeller assembly 1230, is rotatably coupled via a pivot interface 1260. The pivot interface 1260 defines a propeller pivot axis 1270 that extends through the aerodynamic center 1260 collocated with the CV joint. In one embodiment of the present invention the pivot interface 1260 is interposed between the outboard strut 1220 and a vehicle. In another embodiment of the present invention the pivot interface 1260 is interposed between the outboard strut 1220 and a gimbal assembly (not shown). In other embodiments the outboard strut(s) convey the load to the duct which thereafter conveys the load to the pivot interface.

Gyroscopic Precession

When vectoring thrust by tilting a spinning body, in this case the propulsor of the present invention, inertial effects, also known as gyroscopic precession, must be considered. As taught by U.S. Pat. No. 6,719,244 (Gress, 2004) moments generated by tilting a spinning body can be great enough to control a craft in themselves. However, if their production is unintended, they must be mitigated or countered.

Gyroscopic precession is the phenomenon where the axis of a spinning object, such as a gyroscope, moves in a circular path when an external torque is applied. This occurs due to the angular momentum of the spinning mass and the torque acting on it. When an object spins, it has angular momentum (L). The direction of L is along the axis of rotation, determined by the right-hand rule. Torque (T) is the rotational equivalent of force. It is defined as the rate of change of angular momentum:

$$T = dL/dt$$

Gyroscopic precession is the result of the interaction between angular momentum and external torque. When a torque is applied perpendicular to the axis of a spinning mass, the change in angular momentum causes the axis of rotation to move in a circular path, rather than tipping over. This is why gyroscopes can maintain their orientation and resist changes to their axis of rotation The primary considerations with respect to inertial effects such as gyroscopic precession are the mass and inertia of the rotating body, the rotational speed of the body, the rate of tilt or pivot of the body, and the location of the pivot axis with respect to the rotating body.

With a propeller the optimal rotational speed for thrust and efficiency is generally determined by the desired velocity at the tips of the propeller. Typically, a ducted propeller spins much faster than an unshrouded one. As a ducted propeller is generally smaller in diameter than an unshrouded propeller it must spin faster to achieve an equivalent tip speed and thrust.

Increasing rotational velocity increases the centrifugal accelerations of components on the propeller assembly and gyroscopic precession (GP) moments. High rotational speeds of propeller blades in a ducted propeller configuration leads to larger centrifugal forces than would typically be seen in a slower spinning, larger diameter rotor. As would be appreciated by one of reasonable skill in the relevant art the mass and inertia of the spinning body are proportional to the adverse GP moments the body will generate.

To keep the unwanted centrifugal loads and gyroscopic precession moments within reason, the inertia of the spinning components must be minimized. Therefore, the mass of pitch bearings to vary propeller blade angle of attack and thus the thrust of the blades—as is typical in a rotor or slower spinning propeller—are not practical in a ducted propeller application. In one embodiment of the present invention a plurality of fixed pitch propeller blades are utilized to eliminate the weight and inertia of the pitch bearings that would otherwise be required for variable pitch blades. In other embodiment of the present invention a lightweight trailing edge portion and a surface hinged are included to vary thrust produced by the propeller assembly for the same number or propeller revolutions. Gyroscopic precession forces created due to the movement of a rotating mass may travel back into the airframe through the control system (whether pushrods or cables) and ultimately influence flight characteristics of the craft. Some craft counter such moments in operation with their wings and control surfaces. Other craft may not have exterior controls with which to counter them. One embodiment of the present invention includes a gyroscopic precession compensation system that works with the propulsor to reduce or eliminate any GP induced by the directed thrust of the propulsor.

Gyroscopic Precession Compensation (GPC)

In one embodiment of the present invention, the outboard struts host aerodynamic vanes 395. Leading and trailing edge surfaces coupled to each outboard strut act in coordination, and in interaction with the exit flow of the propulsor, to produce a force perpendicular to the outboard strut.

Figure 13A:
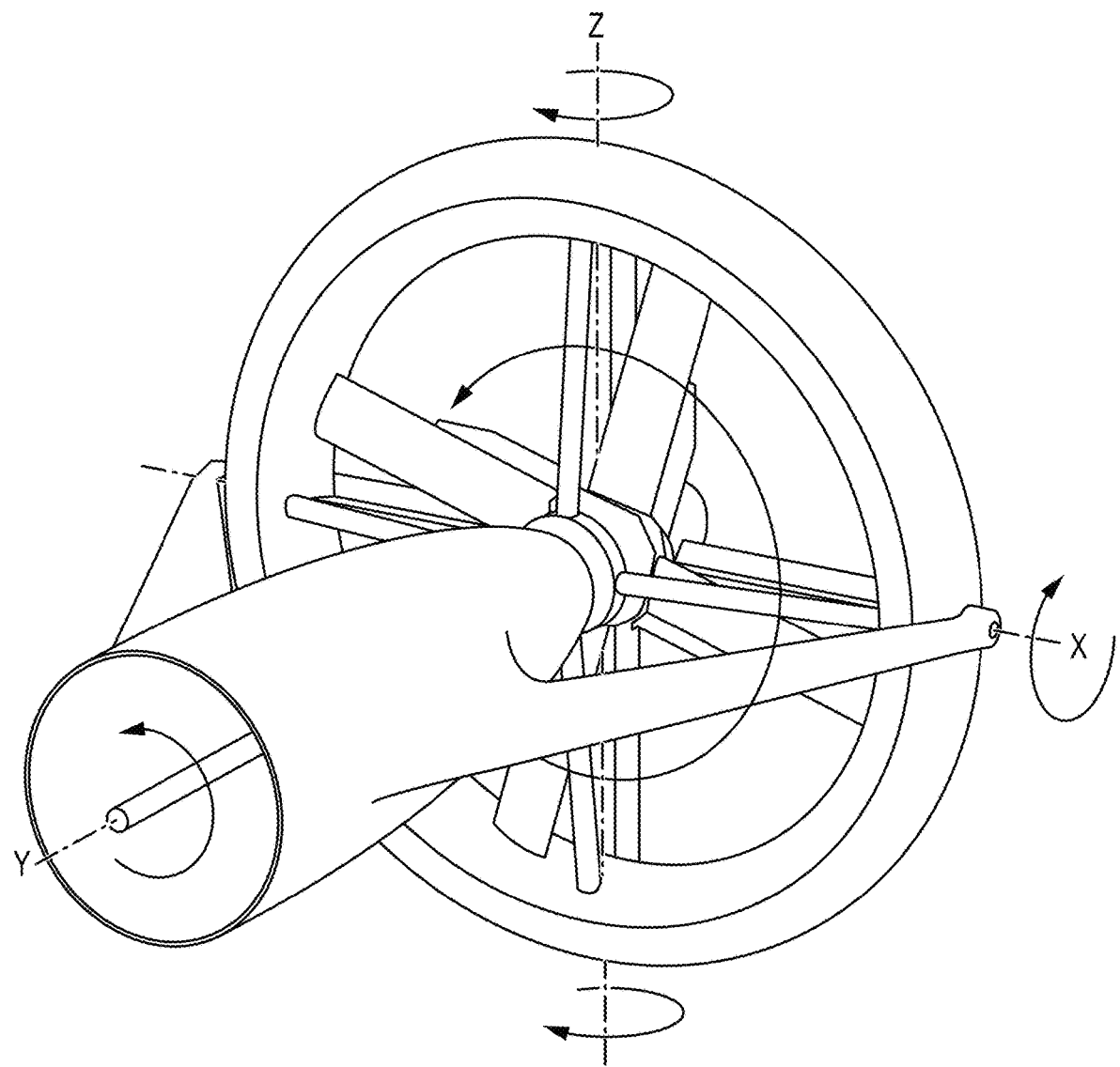
FIGS. 13A and 13B illustrate a gyroscopic precession control mechanism in the pitch axis for a thrust vectoring ducted propeller according to one embodiment of the present invention.
Figure 13B:
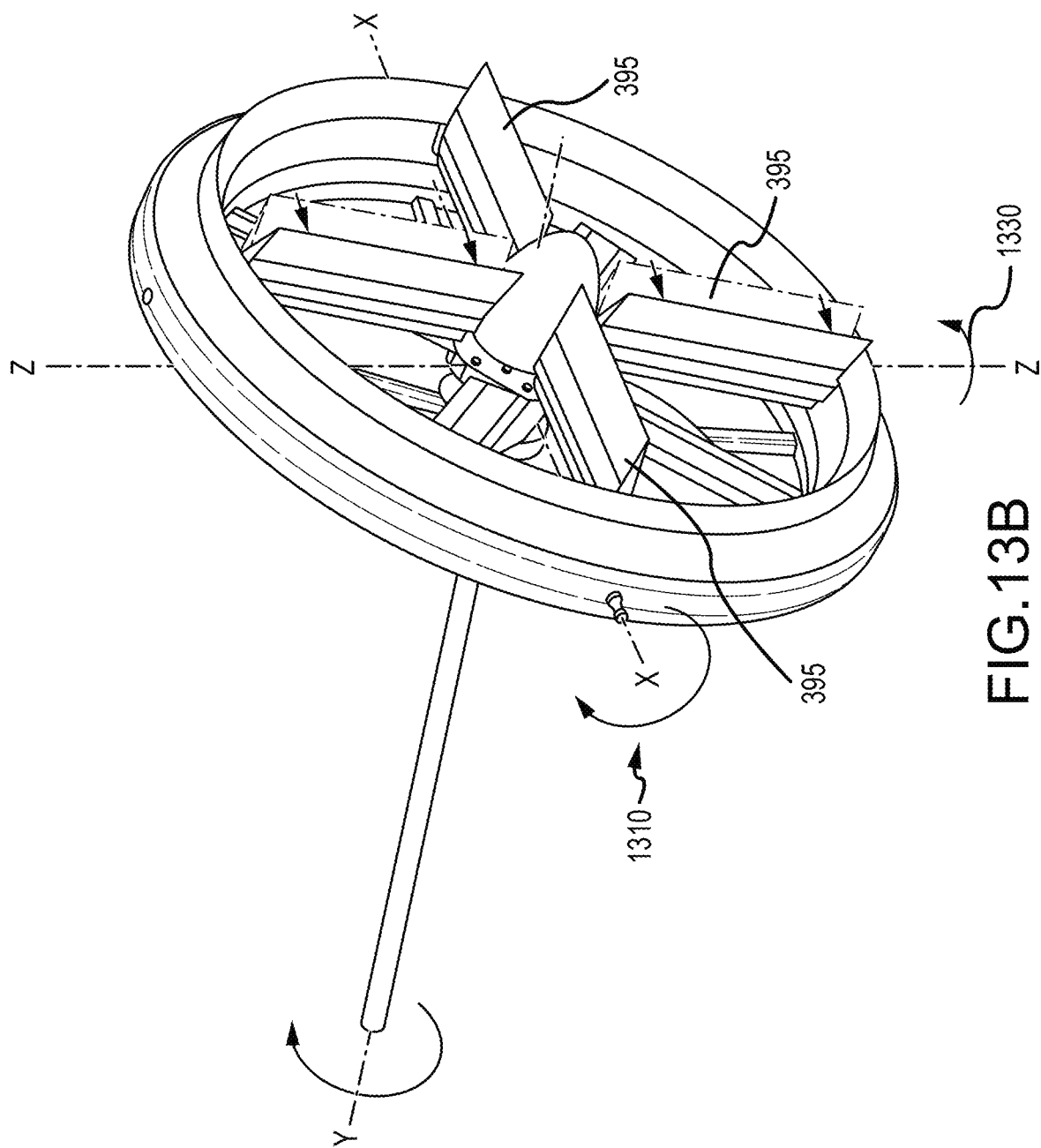

With reference to FIGS. 13A and 13B, the vanes 395 of the present invention act as the active component of a gyroscopic precession compensation system (GPC). Unlike control surfaces in a typical craft, the GPC can be used as required to counter adverse precession moments before they reach or are transmitted to the craft. In operation the vanes 395 move in a non-intuitive direction than would control surfaces and only move when the propulsor is actively tilting. The vanes 395 return to their neutral state as soon as tilting motion has stopped. This differs from typical control surfaces which must remain deployed the entire maneuver to produce the required control moment which increases drag and energy losses. The momentary movement of the control vanes 395 in the present invention to counter gyroscopic precession is more efficient aerodynamically than a control surface held at an angle of attack to produce a counter force over the duration of a maneuver.

FIG. 13A shows the direction of the gyroscopic precession moment created when moving the Propulsor of the present invention rotates 1310 in pitch, (about the X axis). As the propeller duct 320 and gimbal assembly 340 move as a unit about the X axis a counterclockwise GP force 1330 is created about the Z axis. To counter the GP moments of tilting the propulsor in pitch about the X axis, the GPC actuates the vanes 395 on the orthogonal vertical (Z axis) to counter the gyroscopic effect as shown in FIG. 13B. In this example the vanes 395 to the Z axis deflect the thrust creating a force opposite the vane deflection. As the vanes are not located at the aerodynamic center of the propeller blades the force created by the vanes creates a moment. The blade deflection is controlled to create a moment counter to the GP moment.

Figure 14A:
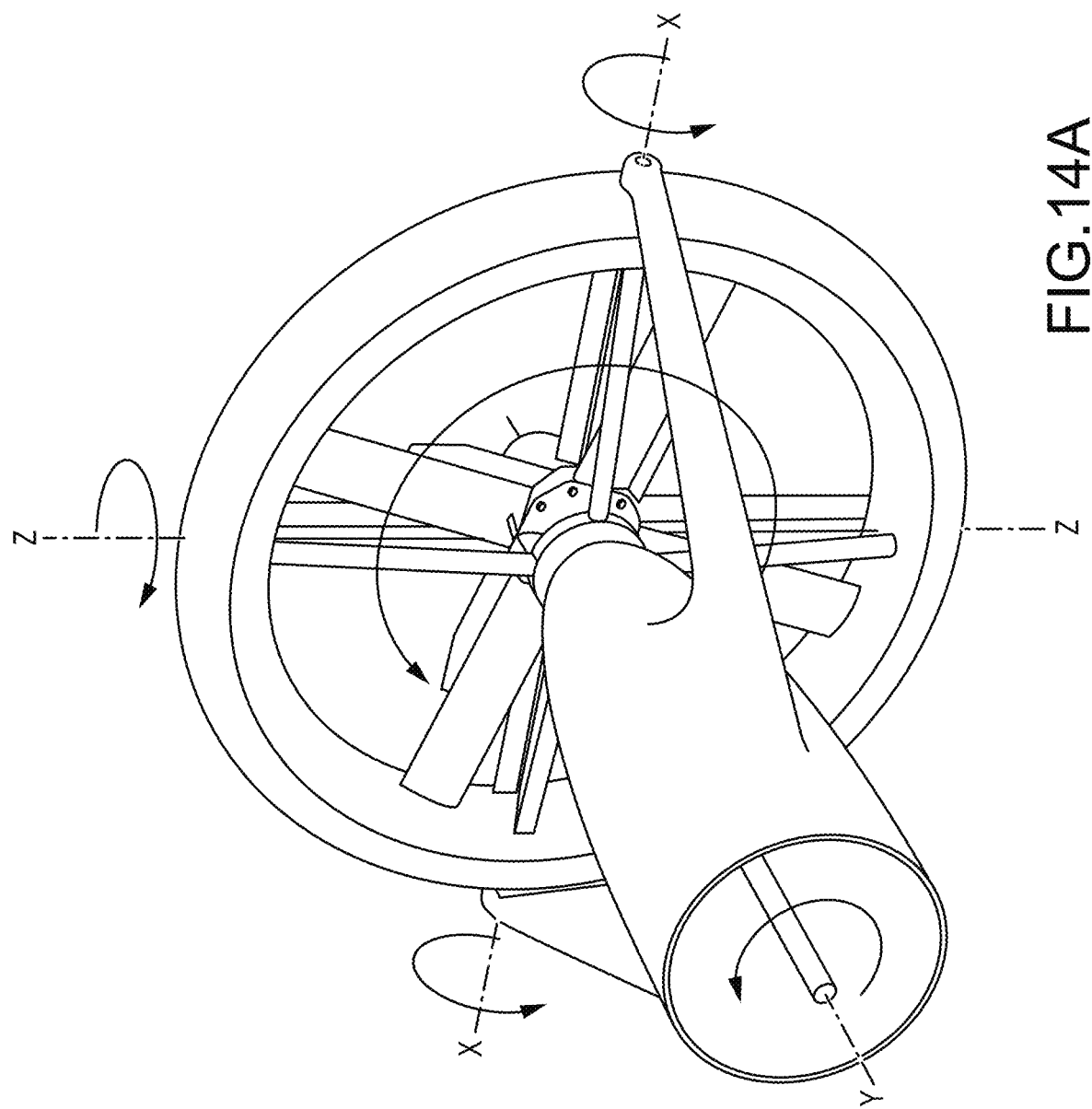
FIGS. 14A and 14B illustrate a gyroscopic precession control mechanism in the yaw axis for a thrust vectoring ducted propeller according to one embodiment of the present invention.
Figure 14B:
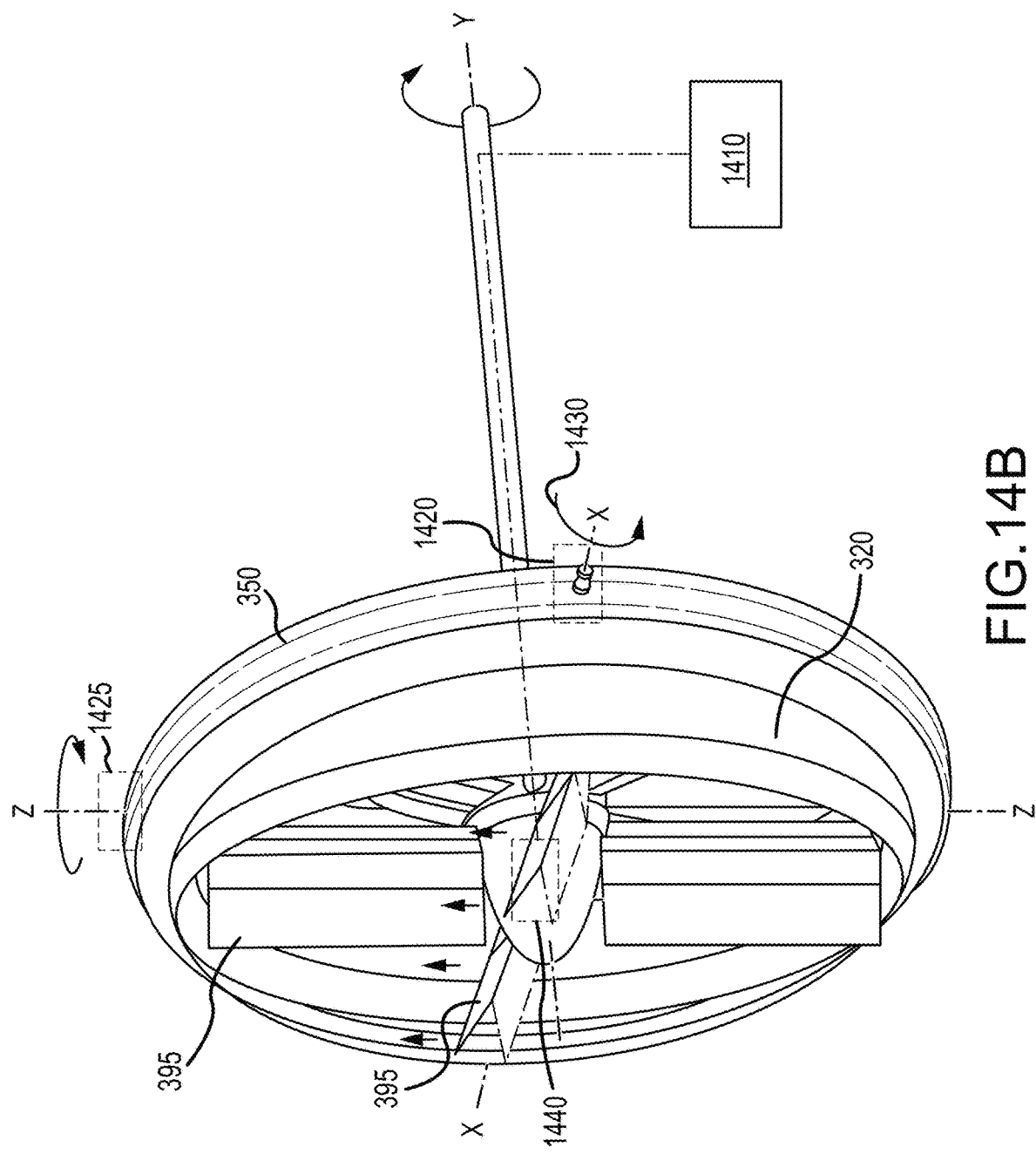

FIG. 14A shows the direction of the gyroscopic precession moment note the vanes 395 in the X axis are not deflected, as no GP in yaw was created when moving the Propulsor about the Z axis or in yaw. FIG. 14B shows a deflection of vanes on the X axis to produce a force downward and thereby a GPC reaction force 1430 to a yaw tilt.

The GPC calculate and counters GP and exterior aerodynamic forces acting on the Propulsor in flight in real time.

The GPC of the present invention includes a microprocessor 1410 and sensor suite 1420, 1425 to determine the rate and angle of vane actuation required to counter GP. Servos 1440 and a linkage common in the art move the control vanes. In one embodiment of the present invention the GPC and associated components reside in the tail cone of the propulsor and require no interaction with the host craft. In another embodiment, the microprocessor is housed within the host craft with the servos remaining in the tail cone. A sensor 1420 and an encoder at the interface between the gimbal assembly and fuselage of the craft at the gimbal pivot interface and another sensor 1425 between the gimbal assembly and propeller duct at the pivot interface along with a tachometer to measure the rotational velocity of the propeller measure the velocity of the flow in the vicinity of the vanes to determine the necessary vane deflection for each propulsor deflection.

Figure 15:
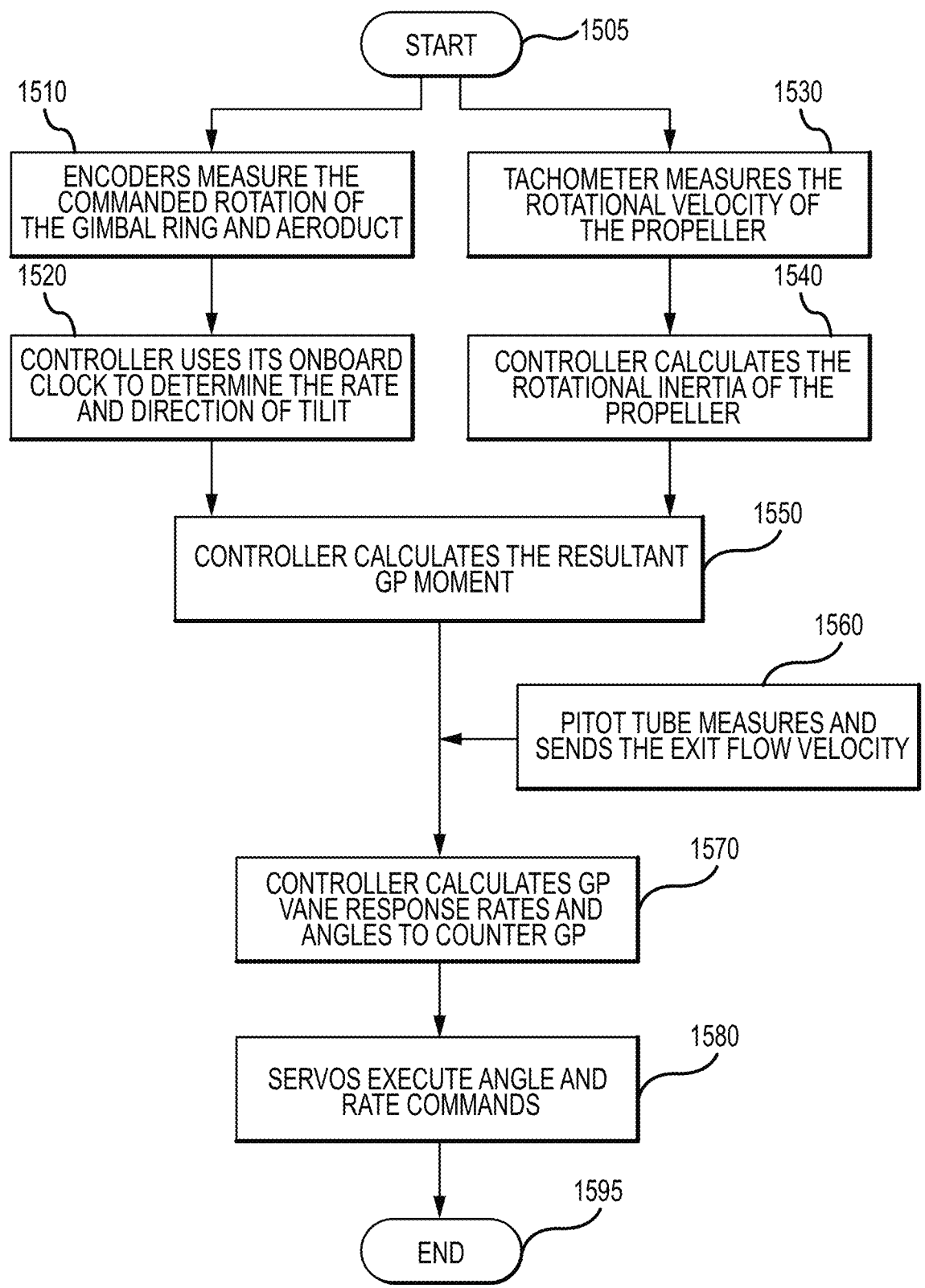
FIG. 15 presents a flowchart of a methodology for gyroscopic presession control for a thrust vectoring ducted propeller according to one embodiment of the present invention.

FIG. 15 presents flowchart for a GP compensation methodology according to one embodiment of the present invention. The process 1505 begins with encoders measuring

1510 the commanded motion of the gimbal assembly and propeller duct as well as using an onboard clock to determine 1520 the rate and direction of tilt (angle/speed=rate). A tachometer 1530 supplies the controller with the rotational velocity of the propeller assembly—which has a known inertia—enabling the controller to calculate 1540 a rotational inertia. Combining the tilt rate and rotational inertia the controller determines 1550 a resultant gyroscopic precession moment. A sensor such as a pitot tube supplies 1560 the flow velocity (thrust) produced by the propulsor to the controller. The controller thereafter calculates 1570 a required vane deflection angle and deflection rate and directs 1580 vane movement to the servos coupled to each vane, ending 1595 the process.

As one of reasonable skill in the relevant art will appreciate, the vanes can also be used as conventional control surfaces. They can all be rotated in unison to induce a rolling moment on the host vehicle, providing it with both propulsion and three axis-control. The vanes and ducts also provide an aerodynamic steering capability to the host craft by acting as a ring tail when gliding in the event of loss of thrust or to generate corrective yaw moments during autorotation.

Figure 16:
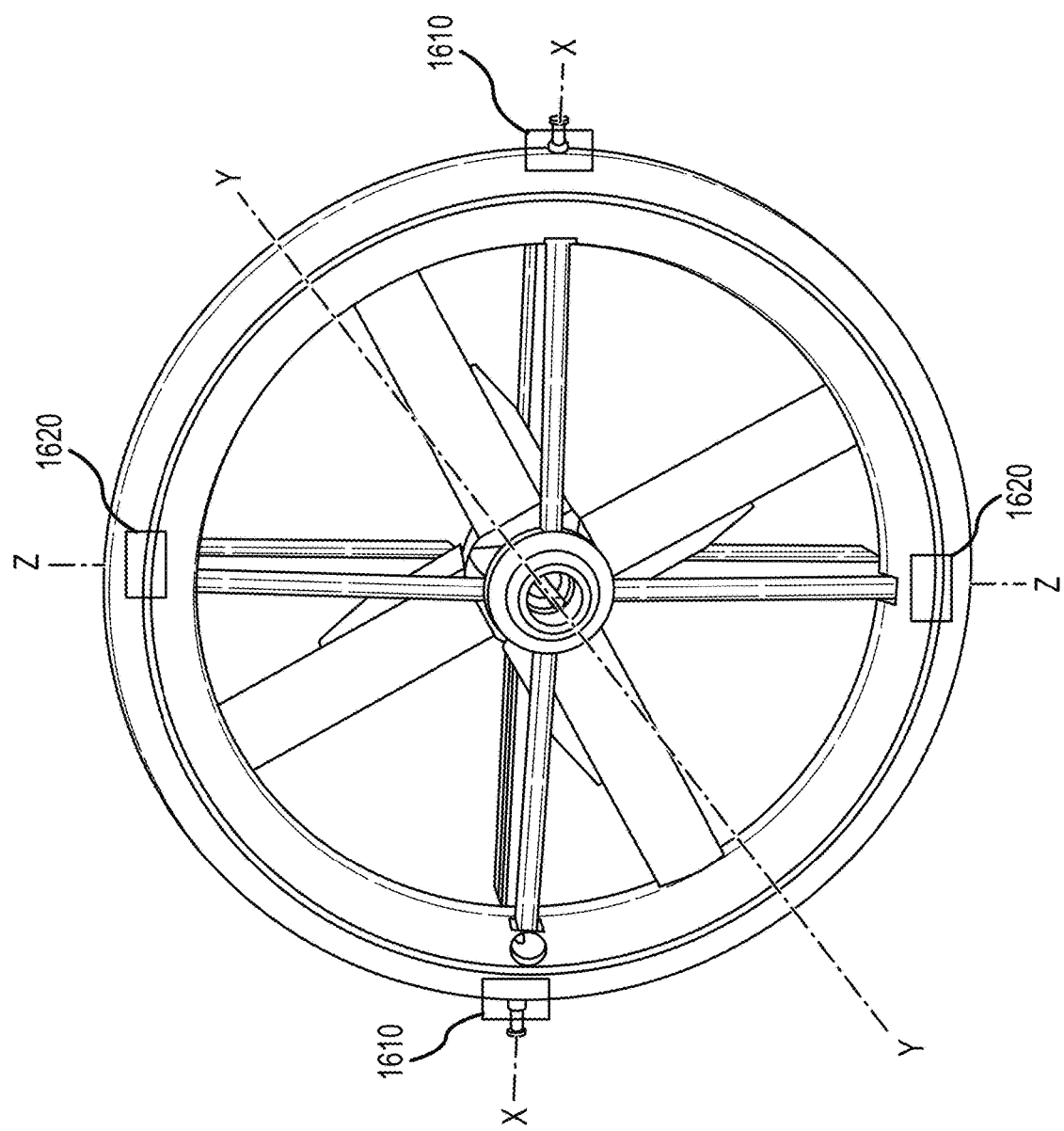
FIG. 16 illustrates the primary host vehicle interface for a thrust vectoring ducted propeller according to one embodiment of the present invention.
Figure 17:
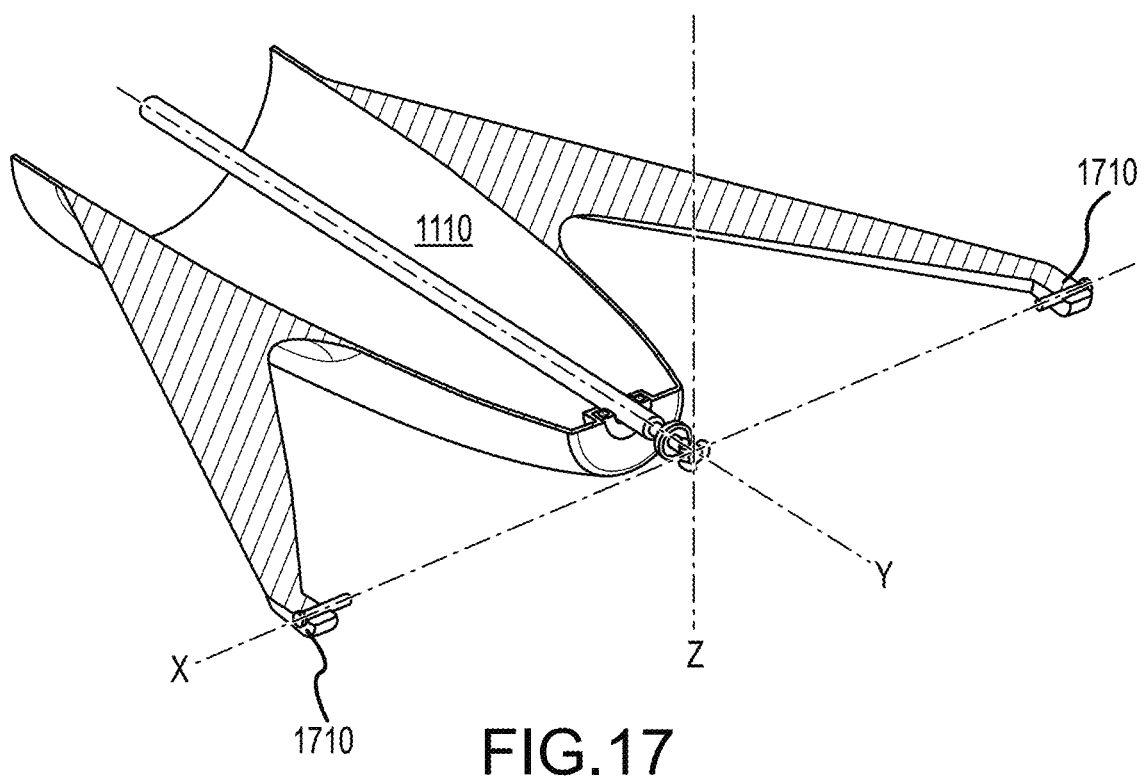
FIG. 17 is a cutaway view of a host vehicle interface for a thrust vectoring ducted propeller according to one embodiment of the present invention.

As previously described, in the preferred embodiment the propulsor assembly is two-dimensionally rotatably connected to a fuselage of a craft. The propulsor of the present invention, shown in FIG. 16, identifies control interfaces 1610, 1620 for propulsor manipulation. FIG. 17 provides a cut-away view of a craft's fuselage at the attachment points 1710 of a propulsor. The propeller assembly shown in FIG. 16 is coupled to the fuselage of a craft, shown in FIG. 17, in rotation at two attachment points with a driveshaft terminating in a CV joint, such as a tripod joint, interfacing with the propeller assembly. An additional interface between the craft and propulsor, which is not shown, are pushrods which commonly exit a craft to actuate control surfaces. A pitch and yaw pushrods connect with the propulsor in two places. A pitch pushrod connects with the propulsor at a pitch interface enabling the gimbal assembly to rotate about the X axis at the gimbal pivot interface(s). A yaw pushrod connects with the propulsor at a yaw interface enabling the propeller duct to rotate about the Y axis at the pivot interface.

The pushrods point the direction of the thrust vector in pitch and yaw, and any combination thereof. The GPC vanes can be further used for aircraft roll through an additional electrical interface (not shown) to command GPC servos. Note, there are no lateral or axial loads exerted on the drive shaft.

Figure 18:
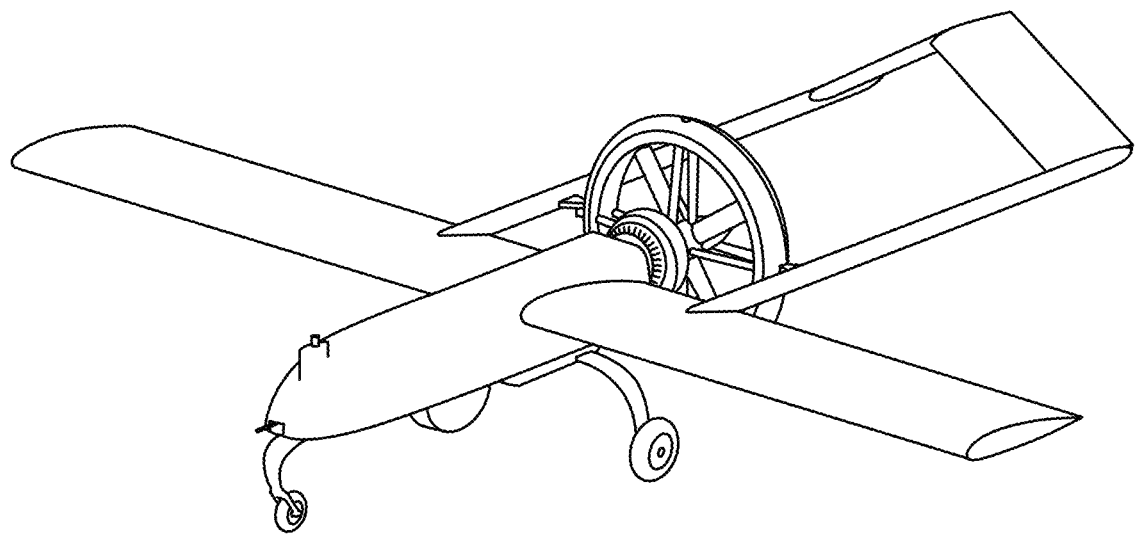
FIG. 18 shows a reconnaissance UAV with twin-boom configuration integrated with a thrust vectoring ducted propeller according to one embodiment of the present invention.

FIGS. 18-23 present various aircraft equipped with the propulsor of the present invention. FIG. 18 shows a typical reconnaissance unmanned aerial vehicle (UAV) with twin-boom empennage integrated with the present invention. The vehicle's airframe presents an ideal existing structure for the Propulsor's integration, as disclosed in U.S. Pat. No. 11,447,246 (Kunz et al., 2022). The Propulsor in this type of craft is in the pusher configuration with dual axis tilting and optional thrust control. The integration of the Propulsor immediately behind the wing may increase lift and its dual axis tilting would augment control in all directions. The optional thrust control provides actuated trailing edges allowing trimming the propeller camber for better power at takeoff, and efficiency in cruise flight.

Figure 19:
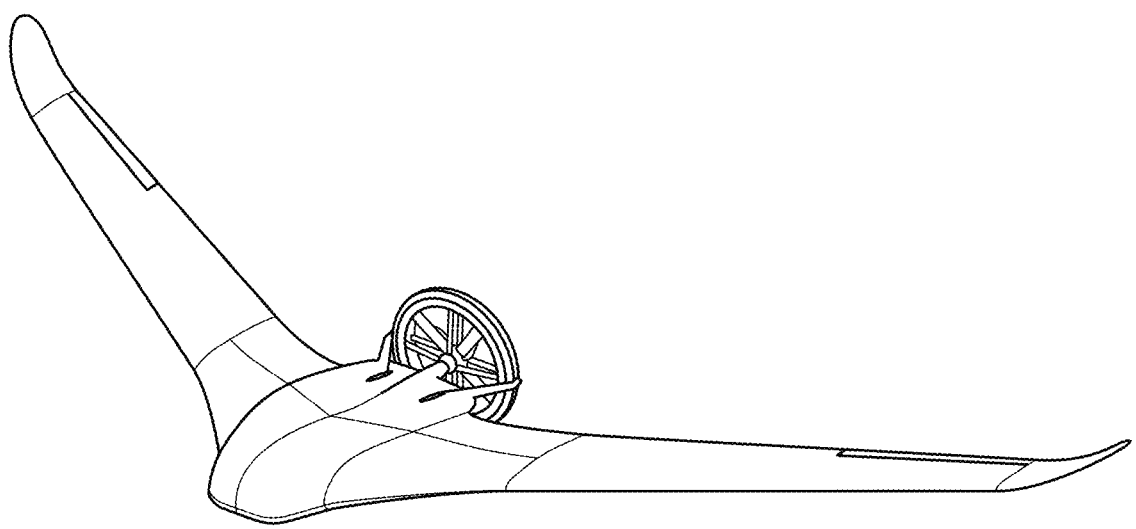
FIG. 19 shows a blended body flying wing vehicle integrated with a thrust vectoring ducted propeller according to one embodiment of the present invention.

FIG. 19 shows an integration of one embodiment of the present invention into a blended body flying wing type vehicle. In this figure, the Propulsor is shown mounted aft of the wing in a pusher configuration with the dual-axis tilting, variable thrust, and GP vanes with roll functionality. The invention in this configuration serves as both the propulsor and control system, eliminating the need for an empennage and alerions. With the elimination of control surfaces and the enclosed propeller blades, the detectable signature of the aircraft would be minimal.

The propulsor could also be integrated forward of the wing in the puller configuration, or together in both positions. Mounting the propulsor in the forward position simplifies wing folding mechanicians as is often used in tail-sitters as disclosed in U.S. Pat. No. 10,287,013 (Starace et al. 2019). The invention maintains the benefits of the configuration but reduces its complexity by eliminating the cyclic pitch control mechanism of the rotor used only in vertical and hover flight modes.

With two propulsors integrated both forward as a puller and aft of the wing as a pusher the configuration presents a significant improvement to U.S. Pat. No. 9,731,820 (Godlasky et al. 2017) The ability to vector the thrust eliminates the need for outboard motors and propellers for control in both the vertical and horizontal phases of flight. The two propulsors tilting in tandem can lead to quick transitions between the two modes of flight.

Figure 20:
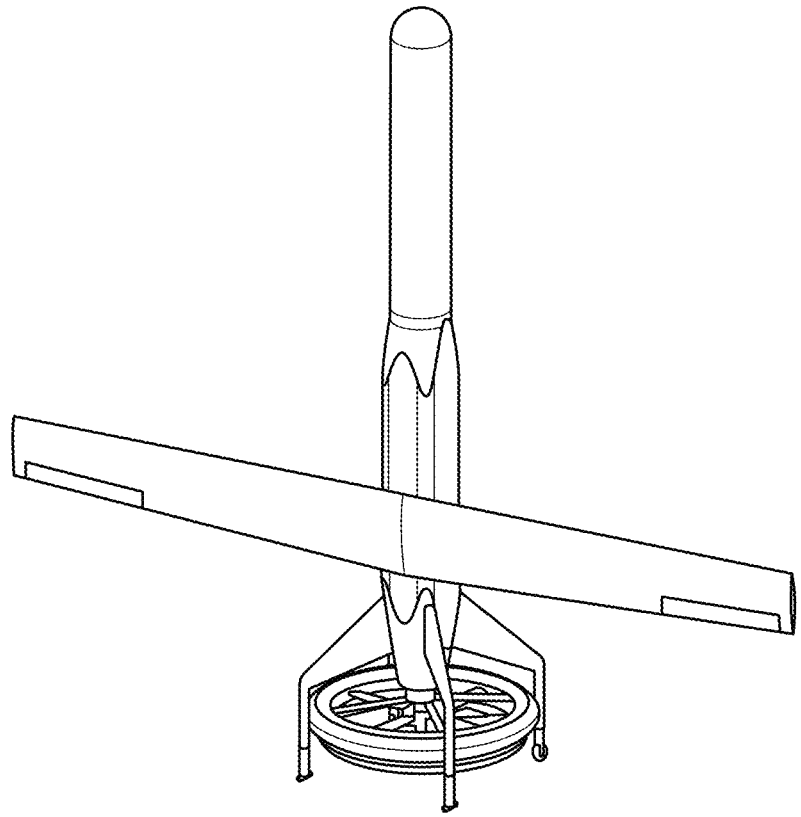
FIG. 20 shows a tail sitter vehicle integrated with a thrust vectoring ducted propeller according to one embodiment of the present invention.

FIG. 20 shows the integration of the present invention on a tail-sitter unmanned aerial vehicle. Tail-sitters generally transition from vertical take-off and landing to horizontal flight for speed and range. They are especially sensitive to surface winds in the vertical mode, so exposed wing area is generally minimized. An example is taught by U.S. Pat. No. 9,365,290 (Morris, 2015) which discloses a ducted fan with control surfaces in the slipstream of the duct and ailerons in the wing for control. The control surfaces are necessarily short in chord to maximize clearance to the ground and limited in length by the radius of the duct. The constraints on surface area of both the wing and control surfaces constrains the vehicles maneuverability.

The propulsor as shown in FIG. 20 is in the pusher configuration with the dual-axis tilting, variable thrust, and GPC for precession correction and roll. With the propulsor integrated into a tail-sitter, the vectored thrust provides the control moments rather than aero-surfaces which are reliant on the velocity of the slipstream. The vectored control moments are greater than what is possible with surfaces particularly in low-speed vertical flight and hover. Integration of the present invention can enable better control during takeoffs and landings in windy conditions, quicker transitions and extreme evasive maneuvering.

In all tail-sitter integrations, the variable thrust enables quick adjustments while landing to compensate for any engine lag. Significantly for all tail-sitters, during takeoff on a canted surface or a rolling ship deck, the Propulsor pivots under control of the flight controller continuously prior to takeoff to assure a vertical ascent regardless of the direction the vehicle is pointing at takeoff. With a fixed propeller or ducted fan, a correction is required when departing a canted surface which adversely affects its ability to hold position.

Figure 21:
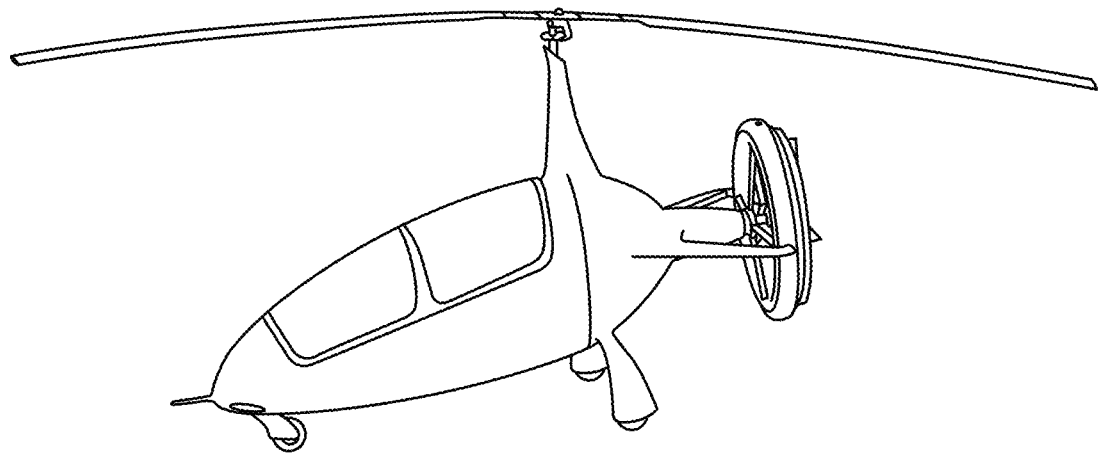
FIG. 21 presents a gyroplane integrated with a thrust vectoring ducted propeller according to one embodiment of the present invention.

FIG. 21 shows an integration of the propulsor of the present invention on a gyroplane aircraft in configured as a pusher with dual axis tilting and GP vanes to counter precession. In a typical gyroplane the empennage and control surfaces are located outboard of the propeller, with some structural difficulty. This places them in the high velocity propeller slipstream to increase their effectiveness in low-speed flight. The structure connecting the empennage with the fuselage places constraints on the diameter of the propeller. The open propeller and the blade's tip vortices interaction with the structure is a known source of noise.

U.S. Pat. No. 9,868,507 (Meier et al. 2018) discloses a means of locally mitigating the noise caused by the interaction.

The integration of the present invention on a gyroplane eliminates the need for the empennage, control surfaces, and its structures. It also eliminates propeller noise due to tip vortices. The Propulsor in this configuration provides yaw control and pitch trimming. Low speed yaw control issues taught by U.S. Pat. No. 9,611,037 (Groen, 2017) would be resolved by direct pointing of the thrust vector rather than aerodynamic surfaces. The ability to vector the thrust in pitch solves one of the primary control issues with these types of craft which is the varying pitch moments generated with changes in thrust and the variable drag of the main rotor. If power is lost, the propulsor with is ducts and vanes can steer the craft in pitch and yaw for landing in autorotation.

For compound gyrocopters with propellers mounted off centerline and outboard on the wing, U.S. Pat. No. 11,174,016 (Carter, 2021) teaches four fixed and canted propeller-motor pairs for yaw and roll control. An improved variation is the Propulsor presented herein integrated with single axis tilting and differential throttle control to reduce the number of engines, weight, and complexity.

Figure 22:
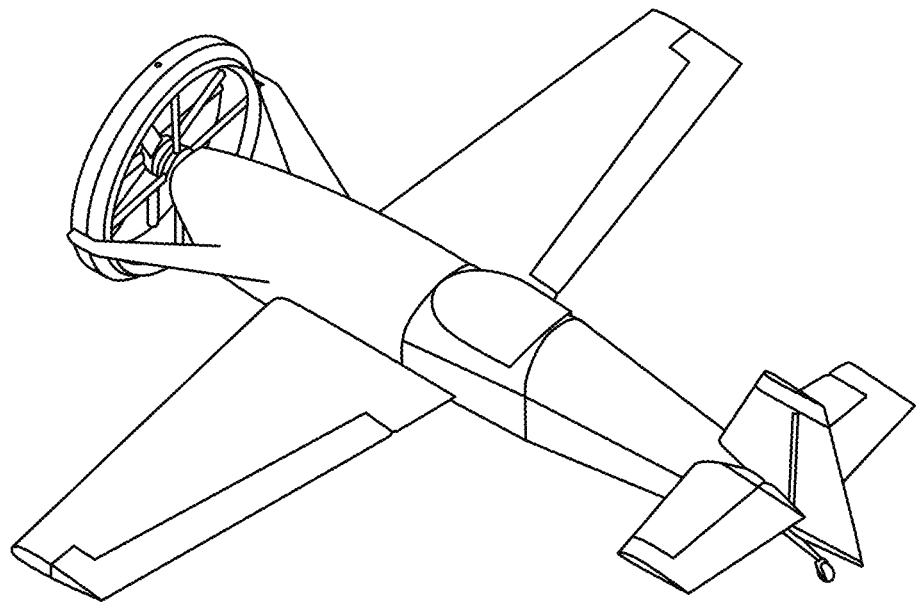
FIG. 22 shows a conventional puller general aviation aircraft integrated with a thrust vectoring ducted propeller according to one embodiment of the present invention.

FIG. 22 shows the puller version of the present invention integrated into a general aviation aircraft. In this configuration the aircraft can use its own control surfaces for control and the propulsor adds the benefit of augmenting control for extreme maneuvers and flight outside its normal envelope.

Maneuverability that exceeds that taught by US patent application 2024/0076066 (Moore et al. 2024) in which thrust vectoring was only possible about a single axis (pitch). With the full gimballing enabled with the propulsor tilting the thrust for yaw leads to an increase in the flow around the opposing wing providing higher lift and a natural roll tendency in the desired direction.

Figure 23:
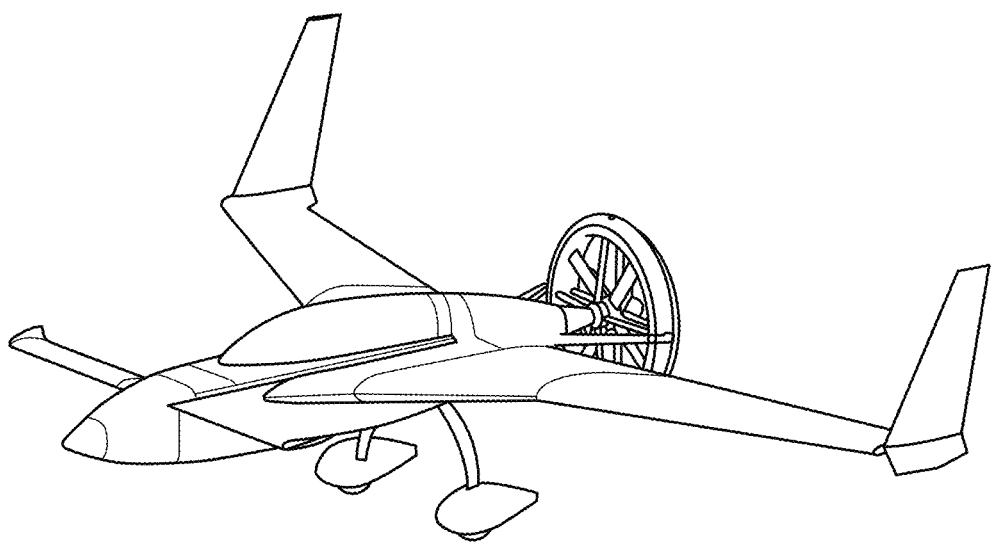
FIG. 23 shows a pusher type of general aviation aircraft integrated with a thrust vectoring ducted propeller according to one embodiment of the present invention.

FIG. 23 shows the present invention integrated into a pusher-style general aviation aircraft. In this integration, the propulsor is in the pusher configuration with the dual axis tilting. Like the puller aircraft, the propulsor augments the existing control system, and enables advanced capabilities such as trimming the aircraft continuously in flight as fuel is burned and the CG shifts to obtain better efficiencies. Noise of the propeller due to its constrained diameter and high rotational velocity is reduced.

In both these existing fixed-wing integrations where the vehicle has the control surfaces in place the need for GPC is reduced or eliminated, as the vehicle itself is capable of countering precession moments. Although not shown, additional integrations include using the propulsor in seaplanes to provide better takeoff performance and a steering capability on water, and on airboats and hovercraft for improved maneuverability.

In addition to improving the performance and capabilities of existing craft, many new types of craft are enabled by the present invention.

While there have been described above the principles of the present invention in conjunction with a fully gimballed ducted propeller, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features that are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The Applicant hereby reserves the right to formulate new claims to such features and/or combinations of such features during the prosecution of the present application or of any further application derived therefrom.

What is claimed is:

1. A system for a directional thrust propeller, the system comprising:
    a propeller assembly wherein the propeller assembly includes an aerodynamic center;
    a Constant Velocity (CV) joint coupling a drive shaft to the propeller assembly wherein CV joint is collocated with the aerodynamic center of the propeller assembly; and
    an outboard strut interposed between the propeller assembly and a pivot interface, wherein the outboard strut is configured to convey a load generated by the propeller assembly to the pivot interface and wherein the outboard strut and thereby the propeller assembly is rotatably coupled at the pivot interface, the pivot interface defining a propeller pivot axis extending through the aerodynamic center.

2. The system for a directional thrust propeller according to claim 1, wherein the propeller assembly is housed within a propeller duct and wherein the propeller duct includes the pivot interface.

3. The system for a directional thrust propeller according to claim 2, further comprising a gimbal assembly wherein the gimbal assembly includes a gimbal pivot interface defining a propeller gimbal pivot axis extending through the aerodynamic center.

4. The system for a directional thrust propeller according to claim 3, wherein the propeller duct is rotatably coupled within the gimbal assembly at the pivot interface.

5. The system for a directional thrust propeller according to claim 4, wherein the gimbal assembly is rotatable about the propeller gimbal pivot axis independent of the propeller duct being rotatable about the propeller pivot axis.

6. The system for a directional thrust propeller according to claim 3, wherein the gimbal pivot axis and the propeller pivot axis are perpendicular.

7. The system for a directional thrust propeller according to claim 2, further comprising a main bearing interposed between the propeller assembly and the outboard strut configured to convey the load generated by the propeller assembly to the outboard strut.

8. The system for a directional thrust propeller according to claim 1, wherein the load include a thrust load and radial load.

9. The system for a directional thrust propeller according to claim 8, further comprising an inboard strut interposed between the propeller assembly and the propeller duct, the inboard strut configured to convey the radial load generated by the propeller assembly to the propeller duct.

10. The system for a directional thrust propeller according to claim 9, further comprising a secondary bearing interposed between the propeller assembly and the inboard strut.

11. The system for a directional thrust propeller according to claim 2, wherein the propeller assembly includes a plurality of propeller blades and wherein each propeller blade includes a blade root, a blade tip, a blade main body, and a trailing edge assembly and wherein each trailing edge assembly spans from the propeller root to up to a position short of the blade tip.

12. The system for a directional thrust propeller according to claim 11, wherein the trailing edge assembly of each propeller blade is configured to modify collectively camber of each propeller blade thereby varying the load of the propeller assembly independent of a propeller assembly rotational velocity.

13. The system for a directional thrust propeller according to claim 1, wherein the CV joint is a tripod joint.

14. The system for a directional thrust propeller according to claim 1, wherein the outboard strut includes movable vanes configured to counter gyroscopic precession.

15. A method for producing directional thrust, the method comprising:
  interposing an outboard strut between a propeller assembly and a pivot interface wherein the outboard strut is configured to convey a load generated by the propeller assembly to the pivot interface and wherein the propeller assembly includes an aerodynamic center;
  rotatably coupling the outboard strut at the pivot interface defining a propeller pivot axis extending through the aerodynamic center;
  coupling the propeller assembly to a drive shaft by a Constant Velocity (CV) joint wherein CV joint is collocated with the aerodynamic center of the propeller assembly; and
  rotating the propeller assembly about the propeller pivot axis, the load generated by the propeller assembly directed through the aerodynamic center.

16. The method for directional thrust according to claim 15, further comprising housing the propeller assembly within a propeller duct.

17. The method for directional thrust according to claim 16, further comprising rotatably coupling the propeller duct within a gimbal assembly at the pivot interface wherein the gimbal assembly includes a gimbal pivot interface defining a propeller gimbal pivot axis extending through the aerodynamic center.

18. The method for directional thrust according to claim 17, further comprising rotating the gimbal assembly about the propeller gimbal pivot axis independent of rotating the propeller duct about the propeller pivot axis.

19. The method for directional thrust according to claim 16, wherein the gimbal pivot axis and the propeller pivot axis are perpendicular.

20. The method for directional thrust according to claim 16, further comprising interposing a main bearing between the propeller assembly and the outboard strut thereby conveying the load generated by the propeller assembly to the outboard strut.

21. The method for directional thrust according to claim 16, further comprising interposing an inboard strut between the propeller assembly and the propeller duct thereby conveying a radial load generated by the propeller assembly to the propeller duct.

22. The method for directional thrust according to claim 21, further comprising interposing a secondary bearing between the propeller assembly and the inboard strut.

23. The method for directional thrust according to claim 16, further comprising interposed a main bearing between the propeller assembly and the outboard strut thereby conveying the load generated by the propeller assembly to the outboard strut.

24. The method for directional thrust according to claim 15, wherein the propeller assembly includes a plurality of propeller blades and wherein each propeller blade includes a blade root, a blade tip, a blade main body, and a trailing edge assembly and wherein each trailing edge assembly spans from the propeller root to up to a position short of the blade tip and further comprising collectively extending the trailing edge assemble of each propeller blade thereby varying the load of the propeller assembly independent of a propeller assembly rotational velocity.

25. The method for directional thrust according to claim 16, wherein the outboard strut includes movable vanes and further comprising positioning the movable vanes to counter gyroscopic precession.

* * * * *